(12) United States Patent
Ando et al.

(10) Patent No.: US 7,327,941 B1
(45) Date of Patent: Feb. 5, 2008

(54) SYSTEM FOR HANDLING AUDIO INFORMATION WITH REPRESENTATIVE IMAGE

(75) Inventors: Hideo Ando, Hino (JP); Masafumi Tamura, Chofu (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 449 days.

(21) Appl. No.: 09/662,230

(22) Filed: Sep. 14, 2000

(30) Foreign Application Priority Data

Sep. 29, 1999 (JP) ............................. 11-275571

(51) Int. Cl.
*H04N 7/00* (2006.01)

(52) U.S. Cl. ............................................. 386/96; 69/125

(58) Field of Classification Search ................. 386/96, 386/69, 125

See application file for complete search history.

(56) References Cited

U.S. PATENT DOCUMENTS

| | | | | |
|---|---|---|---|---|
| 5,555,098 A | * | 9/1996 | Parulski | 386/104 |
| 5,835,667 A | * | 11/1998 | Wactlar et al. | 386/96 |
| 5,982,980 A | * | 11/1999 | Tada | 386/96 |
| 5,986,701 A | * | 11/1999 | Anderson et al. | 348/231.6 |
| 6,035,093 A | * | 3/2000 | Kazami et al. | 386/52 |
| 6,167,189 A | * | 12/2000 | Taira et al. | 386/95 |
| 6,240,241 B1 | * | 5/2001 | Yuen | 386/95 |
| 6,249,316 B1 | * | 6/2001 | Anderson | 348/333.05 |
| 6,453,119 B1 | * | 9/2002 | Maruyama et al. | 386/95 |
| 6,519,415 B1 | * | 2/2003 | Kim et al. | 386/98 |
| 6,813,434 B1 | * | 11/2004 | Noguchi et al. | 386/52 |
| 7,167,635 B1 | * | 1/2007 | Ando et al. | 386/96 |

FOREIGN PATENT DOCUMENTS

| | | |
|---|---|---|
| JP | 62-234474 | 10/1987 |
| JP | 64-66839 | 3/1989 |
| JP | 1-257094 | 10/1989 |
| JP | 11-232849 | 8/1999 |
| WO | WO00/62295 | 10/2000 |

OTHER PUBLICATIONS

Notification of Reasons for Rejections mailed on Jun. 20, 2006, from Japanese Patent Office in Japanese Patent Application No. 11-275571.

* cited by examiner

*Primary Examiner*—John Miller
*Assistant Examiner*—James A. Fletcher
(74) *Attorney, Agent, or Firm*—Finnegan, Henderson, Farabow, Garrett & Dunner, L.L.P.

(57) ABSTRACT

Music number #γ and one or more still images (e.g., IMG_01.IOB and IMG_04.IOB) related to music number #γ are recorded in an audio card. In addition, information (e.g., IPI#5) for setting the still image (e.g., IMG_01.IOB) representing the contents of music number #γ is also recorded in the audio card. In this way, the representative image corresponding to the recorded audio information (music number) can be set.

11 Claims, 16 Drawing Sheets

(a) AUDIO CARD (MEMORY CARD) 100 WITH COPY PROTECT FUNCTION

| CARD INTERNAL CONTROL CPU/MPU 101 | ROM 102 FOR RECORDING CONTROL PROGRAMS RELATED TO AUTHENTICATION/KEY EXCHANGE & I/O PROCESSING | CARD SPECIFIC ID & KEY INFORMATION RECORDING REGION (RAM) 103 | APPLICATION DATA RECORDING REGION (RAM) 104 |
|---|---|---|---|

(b)

| BOOT INFORMATION REGION 110 | FILE ALLOCATION TABLE (FAT) RECORDING REGION 111 | ROOT DIRECTORY INTERNAL INFORMATION RECORDING REGION 112 | DATA REGION 113 |
|---|---|---|---|

(c)

| GENERAL COMPUTER INFORMATION RECORDING REGION 120 | AUDIO RELATED INFORMATION RECORDING REGION 121 | GENERAL COMPUTER INFORMATION RECORDING REGION 120 |
|---|---|---|

(d)

| MANAGEMENT INFORMATION RECORDING REGION 130 | AUDIO OBJECT (AOB) RECORDING REGION 131 | IMAGE OBJECT (IOB) RECORDING REGION 132 | TEXT OBJECT (TOB) RECORDING REGION 133 |
|---|---|---|---|

(e)

| PGC SET INFORMATION (PGCSI) RECORDING REGION 140 | AOB SET INFORMATION (AOBSI) RECORDING REGION 141 | IOB SET INFORMATION (IOBSI) RECORDING REGION 142 | TOB SET INFORMATION (TOBSI) RECORDING REGION 143 |
|---|---|---|---|

PGC=PROGRAM CHAIN

(f)

| ORIGINAL PGC (ORG_PGC) INFORMATION RECORDING REGION 150 | USER DEFINED PGC (UD_PGC) #A RECORDING REGION 151 | UD_PGC #B RECORDING REGION 152 | ------------ |
|---|---|---|---|

(g)

| REGION 160 FOR RECORDING INFORMATION OF TOTAL NUMBER OF CELLS EXISTING IN PGC | CELL INFORMATION (CI) #1 RECODING REGION 161 | CI#2 RECORDING REGION 162 | --------- |
|---|---|---|---|

FIG. 3

SYSTEM FOR HANDLING AUDIO INFORMATION WITH REPRESENTATIVE IMAGE

CROSS-REFERENCE TO RELATED APPLICATIONS

This application is based upon and claims the benefit of priority from the prior Japanese Patent Application No. 11-275571, filed Sep. 29, 1999, the entire contents of which are incorporated herein by reference.

BACKGROUND OF THE INVENTION

The present invention relates to a recordable/reproducible information storage medium such as memory card or disc (phase changed optical disc, magneto-optical disc, or magnetic disc).

In particular, the present invention relates to an improvement of a removable and portable information storage medium suitable for recording and/or reproducing digital image information in combination with digital audio information.

In addition, the present invention relates to a method for setting a representative image of information recorded in the information storage medium.

Further, the present invention relates to a method for reproducing information recorded in the information storage medium by utilizing the representative image.

As s system capable of recording/reproducing audio information in/from a portable information storage medium, there exists an MD (mini disc using magneto-optical recording).

In addition, as a system capable of recording/reproducing video information in/from a portable information storage medium, there exists a DVD (digital versatile disc) video.

In the MD, audio information is managed in unit of music, and edit processing such as "combining music" or "dividing music" is enabled. For audio information after editing, the number item of music being reproduced is displayed on a display. In the case where an attempt is made by a user to search desired music, the MD's system allows a direct access by specifying the number item of the desired music. In addition, in such MD, the system is provided such that text information such as music title can be inputted in unit of music, and the user can select a desired music number that he or she wants to reproduce from a list of text information in units of music numbers.

On the other hand, in the case of DVD video, the system is provided such that video information (desired title preference) can be reproduced or direct access to a desired video scene (specific chapter in title) can be done. That is, in such DVD video, a representative image indicative of the contents of video can be provided for each set of video information items (for example, segments in units of chapters).

In a DVD menu screen, representative images of groups of videos (or of chapters) can be arranged in line. The user may select and specify a desired representative image by selecting it with remote controller cursor operation or the like. By doing this, the group of videos (or the chapter) corresponding to the selected and specified representative image is directly reproduced.

According to the above prior art system (MD or DVD video), the following shortcomings exist:

(1) In the MD, only "the number item of music" or "text information in units of music numbers" can be utilized for search.

The search information of MD is limited to "the number item of music" and "text information in units of music numbers". Therefore, in the case of MD, in order to search a desired music number, the user needs to read a text list containing music information, which is time consumable.

In addition, many users often fail to select a music number that they want to reproduce, even by referring to the music title list. This is because the music title (often incorrectly memorized by the user) does not always coincide with the actual contents (melody or the like) of music.

(2) In the MD, the user needs to input search text information, which is cumbersome in environment setting for search.

For example, in the case where the user attempts to copy a music recorded in a CD to an MD, the user needs to input the title of each music number to the MD by using a jog dial. The search environment setting through such input (music tile input in units of music numbers) is very cumbersome, which imposes a heavy burden on the user.

(3) In the DVD video, the management information on the menu screen (including representative image(s)) is complicated.

The DVD video contains complicated management information unique to the respective menu. If an attempt is made to change such menu information, it is required to change a complicated data structure, and it is required to impose a heavy load on processing for the data change.

(4) In the DVD video, no method has been established for setting a representative image corresponding to the "combined/divided music".

The DVD video conform to "reproduction specific standards", and thus, its data structure cannot adapt edit processing such as "combining and/or dividing".

BRIEF SUMMARY OF THE INVENTION

The present invention has been made in view of the foregoing circumstances, and has its first object to provide an information storage medium capable of having information for setting a representative image corresponding to recorded audio information.

In addition, it is a second object of the present invention to provide a method for setting a representative image.

Further, it is a third object of the present invention to provide a method for reproducing audio information recorded by utilizing a representative image.

In order to achieve the foregoing first object, there is provided an information storage medium (card 100 shown or disc 170) in which audio information (AOB or ATS_XX-.AOB) and still image information (IOB or IMG_XX.IOB) are recorded. Audio information (AOB) recorded in the medium has one or more of first reproduction units (music numbers). For at least one (for example, music number #γ) of the first reproduction units (music numbers), set information (IPI#5) of still image information (IMG_01.IOB for, e.g., the picture of a personal computer) representative of the contents of the reproduction unit (music number #γ) is recorded in the information storage medium.

In the above information storage medium, the still image information (IMG_01.IOB) to be first displayed (e.g., display sequence <1> of IPI#5) in the first reproduction unit (music number #γ) is set as still image information (IOB of personal computer) representative of the reproduction unit (music number #γ).

In addition, in the information storage medium (card 100 or disc 170) having recorded therein audio information including a representative image for each reproduction unit (music number), audio information (AOB) and still image information (IOB) are recorded, and at least one of reproduction sequences (PGC/PL) for reproducing the audio information (AOB).

In at least one (for example, original PGC/default PL) of the reproduction sequences (PGC/PL), the still image information (IOB) is displayed at the same time when the audio information (AOB) is reproduced.

In addition, for the reproduction sequences (PGC/PL) in which the still image information (IOB) is displayed, set information (IPI#) for specifying or designating still image information (IOB) which represents the contents thereof is recorded.

In order to achieve the foregoing second object, a method for setting a representative image in reproduction units uses an information storage medium (card 100 or disc 170) in which audio information (AOB) and still image information (IOB) are recorded, and a management information (CI/AOBI/TKI) indicative of a reproduction relationship between the audio information (AOB) and the still image information (IOB) is recorded.

There is a first reproduction unit (music number) for reproducing the audio information (AOB). Recorded in the management information (CI/AOBI/TKI) is information (flag 71) concerning a representative image of the contents of audio information (AOB) reproduced in the first reproduction unit (music number).

In the above representative image setting method, the first audio information (AOB of music number #α) managed by the first reproduction unit (music number) is divided into second audio information (AOB of music number #β) and third audio information (AOB of music number #ζ) reproduced by the first reproduction unit (music number) (ST500).

Then, a still image, which is coincident with the representative image (IMG_02.IOB) of the contents of the first audio information (AOB of music number #α) before divided, is recorded (ST502) in the management information (CI/AOBI/TKI), as a representative image (IMG_02.IOB) of the contents of the second audio information (AOB) and a representative image (IMG_02.IOB) of the contents of third audio information (AOB).

Meanwhile, in the above representative image setting method, fourth audio information (AOB of music number #α) and fifth audio information (AOB of music number #δ) managed by the first reproduction units (music numbers) are combined with each other so as to form sixth audio information (AOB of music number #ε) reproduced by the first reproduction unit (music number) (ST510).

Of a representative image (IMG_02.IOB) of the contents of the fourth audio information (AOB of music number #α) before combined and a representative image (IMG_03.IOB) of the contents of the fifth audio information (AOB of music number #δ) before combined, the representative image (IMG_02.IOB) of the contents of audio information (AOB specified by AOBI) to be reproduced first after combined is recorded in the management information (CI/AOBI/TKI) as a representative image (IMG_02.IOB) of the contents of the sixth audio information (AOB of music number #ε).

In the above representative image setting method, designation information (flag 71) concerning a representative image of the contents of audio information (AOB) reproduced by the first reproduction units (music numbers) is recorded in the management information (CI/AOBI/TKI) (part of the processing at ST502).

Further, in the above representative image setting method, still image information (IMG_01.IOB) to be first displayed (e.g., display sequence <1> of IPI#5) in the first reproduction unit (music number #γ) is set as the still image information (e.g., IOB of the picture of personal computer) being representative of the contents of the reproduction unit (music number #γ).

Still further, in the above representative image setting method, in the case where the still image information (IOB) is displayed at the same time when the audio information (AOB) is reproduced in accordance with the reproduction sequences (PGC/PL), the still image information (IOB) to be first displayed is set as the still image information (IOB) representative of the contents of the reproduction sequences (PGC/PL).

In order to achieve the foregoing third object, a method for reproducing desired audio information from an information storage medium utilizes a representative image. On the information storage medium, audio information having representative images in reproduction units is recorded. The reproducing method employs the information storage medium (card 100 or disc 170) having audio information (AOB), still image information (IOB), and management information (PGCSI) recorded therein.

In the above reproducing method, the management information (PGCSI) is reproduced to search a representative image (ST520). One or more thus searched representative images (e.g., the image shown in (d) of FIG. 1 or FIG. 2) are displayed (ST522). Audio information (AOB; e.g., ATS_05.AOB specified by AOBI#5 of music number #γ) to be reproduced from the thus displayed representative image (e.g., IMG_01.IOB shown in (d) of FIG. 1) is selected (ST524). Then, the thus selected audio information (ATS_05.AOB specified by AOBI#5 of music number #γ) is reproduced (ST526).

The image information (image object IOB) is generally composed of one or more mutually independent still images (still pictures) whose contents are different from each other. However, when a still image (such as JPEG compressed image or I-picture portion of MPEG compressed image) is recorded in a medium, the recording mode for the medium is not always limited to a concept of still image in consideration of a stage at which such image is displayed.

For example, let us consider a case wherein a computer graphic (CG) image of 8 bit plain, capable of performing color display using a 256 color palette, is included in image object IOB. In this case, when the 256 color palette used for the CG image display is sequentially changed with an elapse of time (or when the color palette is cycled), even if original data is a still picture, part of the display screen (a portion at which color cycling is performed) is seen as if it were moving.

Alternatively, for example, let us consider another case wherein 15 continuous images (each of which is a still picture) are recorded in a medium, these recorded images are fetched to a video memory, and the fetched images are then continuously reproduced. In this case, when 15 continuous images are repeatedly reproduced with a rate of 5 images per second, for example, these images are seen as if they were slow motion images of 5 frames/second, looped at intervals of three seconds.

That is, in a broad sense including a visual point of view when a user actually sees an image(s), the above image information (image object IOB) is not limited to a fixed still image or still picture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view illustrating a recording format of a memory card (audio card) that is an information storage medium according to an embodiment of the present invention;

FIG. 4 is divided by editing;

DETAILED DESCRIPTION OF THE INVENTION

Hereinafter, various embodiments of the present invention will be described with reference to the accompanying drawings.

Figure 1:
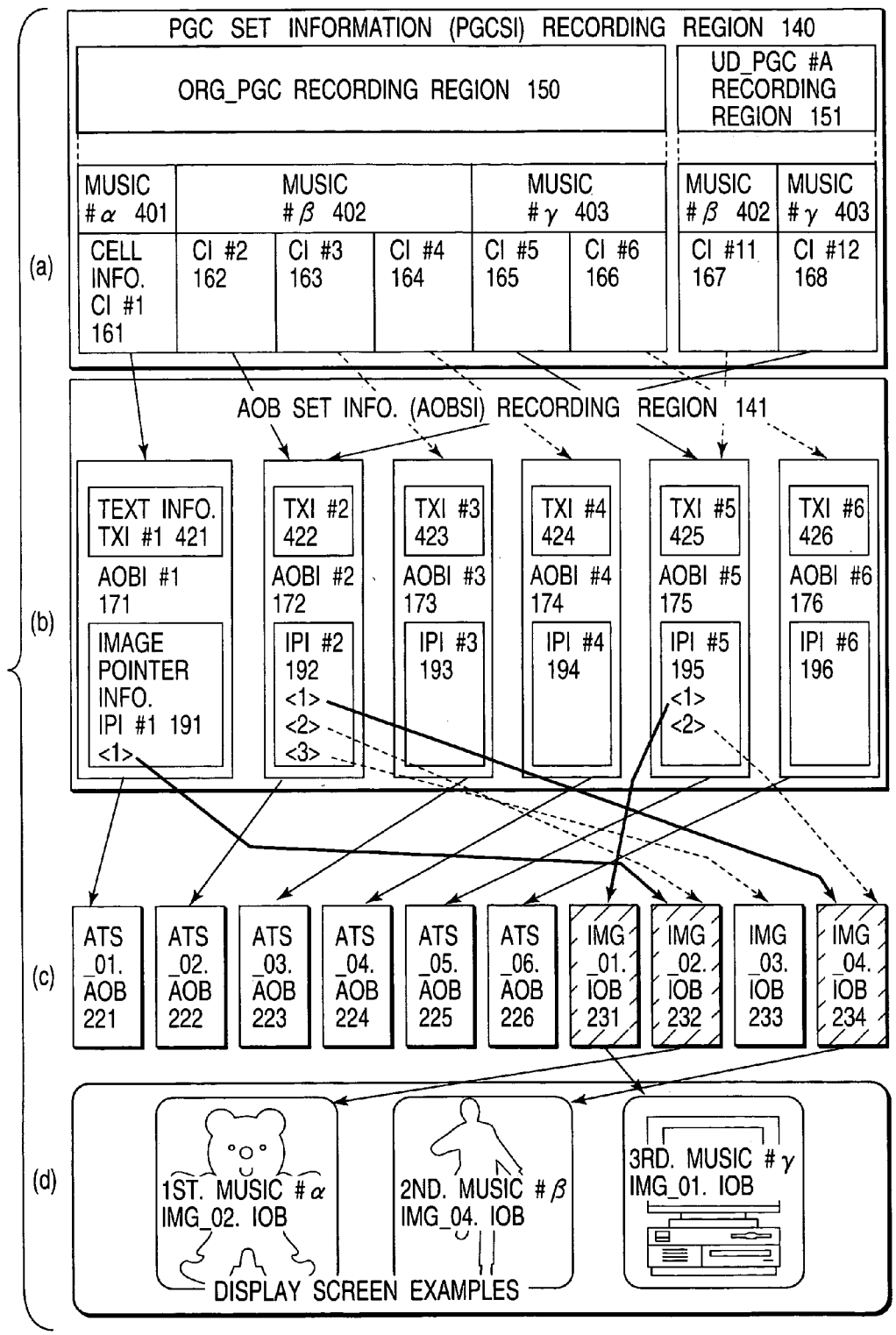
FIG. 1 is a view illustrating an example of how the representative image of each music number is displayed, wherein audio information with still image is recorded in a medium according to an embodiment of the present invention.

FIG. 1 is a view illustrating an example of how the representative image of each music number is displayed, wherein audio information with still image recorded in an information storage medium (audio card or the like) is reproduced in units of music numbers.

In the embodiment of the present invention, all audio information (audio object AOB) recorded in an information storage medium is collected or grouped in units of "music numbers".

The music numbers recorded in the information storage medium include information on the procedures (or sequences) for sequentially reproducing all music numbers continuously. A region having the information recorded therein is referred to as an original PGC (original program chain) information recording region 150.

Management information concerning audio information (AOB) has separate management information units respectively for individual audio information files (AOB files) such as ATS_xx.AOB (xx denotes integer beginning from 01), and audio object information (AOBI) #1, #2, #3, . . . are set in the management information.

In order to enable special reproduction such as time search, fast forward (FF), fast rewind FR or the like, each audio object information (AOBI) # has time map information including information on a relationship between the reproduction time and the recording place (address).

In addition, image pointer information IPI can be provided in the audio object information (AOBI). A still image information file IMG_xx.IOB (xx denotes an integer beginning from 01) is directly specified from this IPI.

The size specified by each cell information CI# in original PGC information recording region 150 corresponds to the entire reproduction range indicated by each corresponding audio object information (AOBI) #1, on the one by one basis.

Each of music numbers #α, #β, and #γ is composed of one or more pieces of cell information CI#. The information, as to which music number each CI# corresponds to, is described in each CI#.

In the present embodiment, although the reproduction sequence of original PGC is defined by the arrangement sequence of the corresponding CI#, the reproduction sequence for each music number is resultantly described in original PGC information recording region 150 from the relationship between the sequence and the corresponding music number.

On the other hand, apart from the reproduction sequence indicated by original PGC, unique information on the reproduction sequences defined by the user can be recorded in user defined PGC recording region 151.

The cell information CI# defined in user defined PGC recording region 151 is structured to enable setting of the corresponding audio object information AOBI and setting of reproduction start time and/or reproduction end time in the time map information defined in that AOBI.

From the above fact, by sequentially allocating the CI#, arbitrary reproduction sequence(s) for audio information (AOB) can be defined in user defined PGC recording region 151.

Cell information CI# partially specifies the inside of the time map information, and thus, it is possible to reproduce only the reproduction range of music number #γ to be reproduced by CI#, provided that this reproduction range is narrower than the reproduction range of the corresponding music number #γ defined in original PGC.

In this manner, without restricted by the reproduction range of a music number defined in original PGC, an arbitrary range of that music number can be reproduced A plurality of arbitrary reproduction sequences specified or defined by the user can be set in user defined PGC recording region 151. Thus, the present embodiment provides a data structure in which a plurality of user defined PGC recording regions #A, #B, . . . can be defined for respective reproduction sequences specified or defined by the user.

As shown in (a) of FIG. 1, recording region 140 (described later by referring to FIG. 3) for program chain set information (PGCSI) has recording region 150 for original PGC (ORG_PGC) and one or more recording regions 151 for user defined PGC (UD_PGC#A).

Here, music numbers. #α 401, #β 402, and #γ 403 are recorded in ORG_PGC recording region 150, and music numbers #β 402 and #γ 403 are recorded in UD_PGC#A recording region 151.

The PGC (program chain) is composed of one or more cells C, and the present embodiment provides a data structure in which the reproduction sequence of music numbers in PGC can be defined according to the arrangement sequence of these cells.

Music number #α 401 in ORG_PGC recording region 150 has cell information CI#1 containing text information TXT#1 and image pointer information IPI#1. This IPI#1 specifies management information 2 of still image IMG_02.IOB contained in recording region 142 for image object set information (IOBSI).

When this still image IMG_02.IOB is reproduced with the start of reproduction of music number #α, at the same time the performance of music number #α begins, an image of "bear" exemplified in (d) of FIG. 1 is displayed at an image display section (described later with reference to FIG. 7), as a representative image of the first music number #α in original PGC.

The audio information (audio data) of music number #α corresponds to ATS_01.AOB specified via AOBI#1.

Music number #β 402 in ORG_PGC recording region 150 has CI#2 containing TXI#2 and IPI#2; CI#3 containing TXI#3 and IPI#3; and CI#4 containing TXI#4 and IPI#4.

In this music number #β, IPI#2 of CI#2 for specifying or designating (via AOBI#2) the first reproduced audio information ATS_02.AOB has three image pointers <1>, <2>, and <3>. By the first pointer IPI#2 <1> of these pointers, management information 4 of still image IMG_04.IOB contained in IOBSI recording region 142 is specified.

When this still image IMG_04.IOB is reproduced with the start of reproduction of music number #β, at the same time the performance of music number #β begins, an image of "running businessman" exemplified in (d) of FIG. 1 is displayed as a representative image of the second music number #β in original PGC.

The second pointer IPI#2 <2> of music number #β specifies still image IMG_02.IOB ("bear") to be displayed at the second part of music number #β, and the third pointer IPI#2 <3> of music number #β specifies still image IMG_03.IOB to be displayed at the third part of music number #β.

The "bear" of IMG_02.IOB shown in (d) of FIG. 1 is the representative image for music number #α of original PGC, but this "bear" is not a representative image for music number #β of original PGC.

Further, music number #γ 403 of ORG_PGC recording region 150 has CI#5 containing TXI#5 and IPI#5; and CI#6 containing TXI#6 and IPI#6.

In this music number #γ, IPI#5 of CI#5 for specifying or designating the first reproduced audio information has two image pointers <1> and <2>. By the first pointer IPI#5 <1> of these pointers, management information 1 of still image IMG_01.IOB contained in IOBSI recording region 142 is specified.

When this still image IMG_01.IOB is reproduced with the start of reproduction of music number #γ, at the same time the performance of music number #γ begins, an image of "personal computer" exemplified in (d) of FIG. 1 is displayed as a representative image of the third music number #γ in original PGC.

The second pointer IPI#5 <2> of music number #γ specifies still image IMG_04.IOB ("running businessman") to be displayed at the second part of music number #γ.

The "running businessman" of IMG_04.IOB shown in (d) of FIG. 1 is the representative image for music number #β of original PGC, but is not a representative image for music number #γ of original PGC.

On the other hand, in UD_PGC#A where the user reallocates music number #β as the first music number and music number #γ as the second music number, management information 3 of still image IMG_03.IOB is specified by IPI#11 of the first music number #β; and management information 1 of still image IMG_01.IOB ("personal computer") is specified by IPI#12 of the second music number #γ.

That is, according to the embodiment of FIG. 1, the representative image (IMG_01.IOB) of the same music (#γ) is identical in original PGC and user defined PGC.

Although not shown in (d) of FIG. 1, the contents of text information specified by the corresponding text information TXI# can be optionally or arbitrarily superimposed on the displayed representative images as the case may be.

Incidentally, as for the technical terms used in the specification of the present invention, various modifications may be made as needed, for example, the original PGC may be referred to as a default play list; the user defined PGC may be referred to as a play list; the cell may be referred to as a default play list track search pointer/play list track search pointer; the audio object information may be referred to as track information; and the image pointer information IPI may be referred to as an image object search pointer.

In the data structure shown in FIG. 1, user defined PGC can specify or define the reproduction sequences only by a connection of music numbers, as specified in original PGC, in unit of "music".

Note here that CI#11 and CI#12 set in user defined PGC specify only the audio information to be reproduced first in the "music number" specified in original PGC.

In user defined PGC#A recording region 151, when settings are changed so as to be reproduced in the order "from music number #γ to music number #β", it is sufficient if AOBI#5 that is management information of ATS_05.AOB to be first reproduced in music number #γ is specified by CI#11, and AOBI#2 that is management information of ATS_02.AOB to be first reproduced in music number #β is specified by the next CI#12.

In the embodiment of FIG. 1, only one still image of IMG_02.IOB is displayed during reproduction of music number #α, and thus, only IMG_02.IOB is specified by IPI#1 in AOBI#1 in which the management information of audio information corresponding to music number #α is described.

In music number #α, only the above one still image is specified, so that the still image of the IMG_02.IOB is automatically set as a representative image for music number #α.

In addition, in the embodiment shown of FIG. 1, the still image to be displayed first in unit of music number is automatically set as a representative image relevant to that music number.

For example, in the case where still images are displayed in the order of IMG_04.IOB, IMG_02.IOB, and IMG_03.IOB during reproduction of music number #β, IMG_04.IOB to be reproduced first during the reproduction of music number #β becomes a representative image indicative of the contents of music number #β.

In the embodiment of FIG. 1, music number #β is configured by audio information files composed of three files ATS_02.AOB, ATS_03.AOB, and ATS_04.AOB.

The still image information and text information concerning this music number #β are recorded in management information AOBI#2 concerning the first reproduced audio information file ATS_02.AOB of music number #β.

More specifically, text information such as music title and the name of singer, concerning music number #β, is recorded in text information TXI#2.

In addition, still image information concerning music number #β is recorded in IPI#2 in the order of display of IMG_04.IOB, IMG_02.IOB, and IMG_03.IOB.

During reproduction of music number #γ, still images are displayed in the order of IMG_01.IOB and IMG_04.IOB, and thus, the information for specifying or designating these still images is recorded in IPI#5 in management information AOBI#5 of the first reproduced audio information of music number #γ.

In the embodiment of FIG. 1, no special information for setting a representative image in unit of music number is provided, and the first displayed still image in the music number is automatically handled as a representative image.

Figure 2:
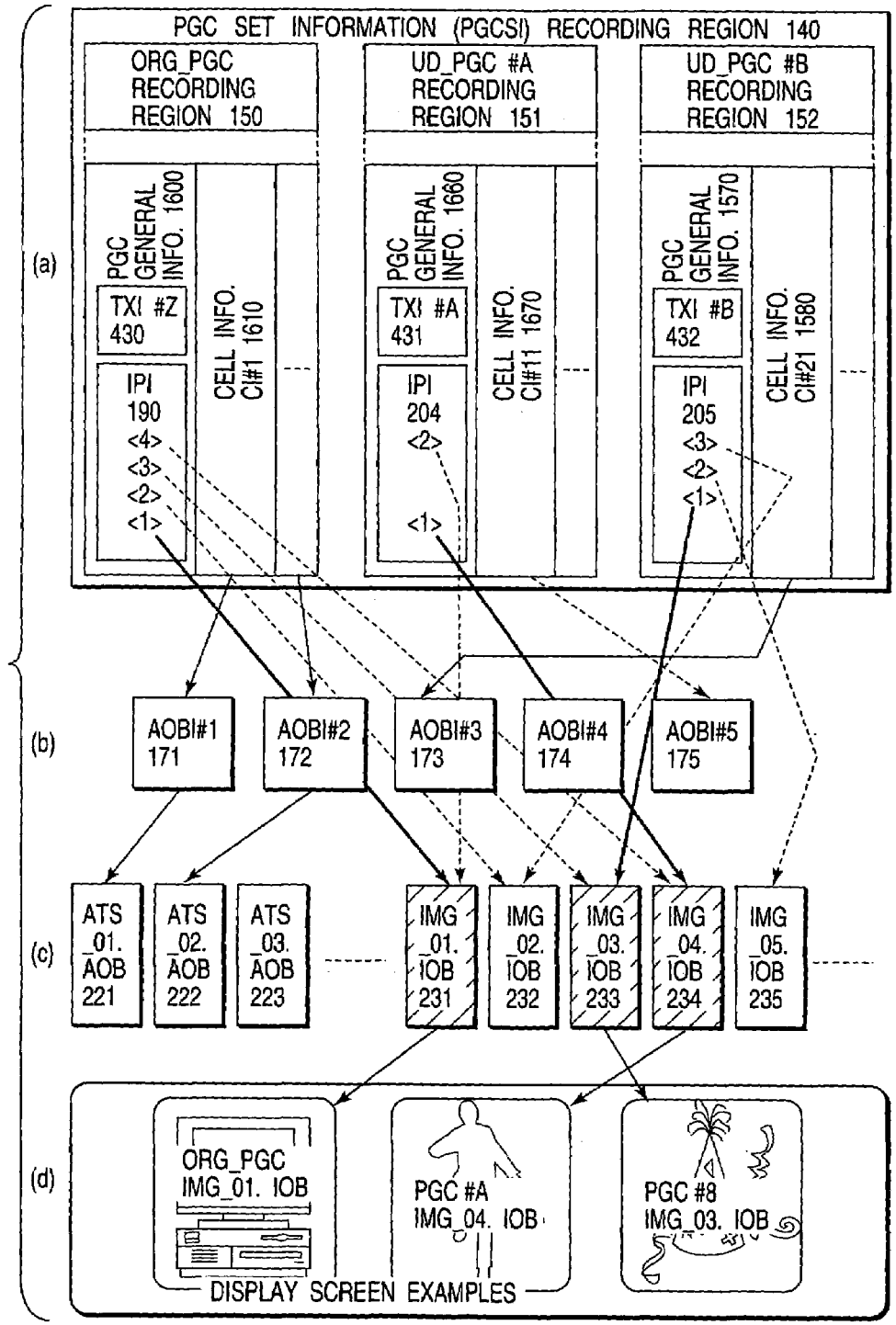
FIG. 2 is a view illustrating an example of how the representative image of each PGC is displayed, wherein audio information with still image is recorded in a medium according to an embodiment of the present invention.

FIG. 2 is a view illustrating an example of how the representative image of each PGC is displayed, wherein audio information with still image recorded in the medium according to an embodiment of the present invention is reproduced in unit of program chain (PGC).

According to the embodiment of FIG. 2, a representative image for each of the reproduction sequences (PGC) as well as representative image(s) in unit(s) of music number(s) can be set.

As shown in FIG. 2, PGCSI recording region 140 includes original PGC and user defined PGC having PGC general information 1600, 1660, and 1570 in which general information concerning each PGC is recorded, and text information TXI#Z 430, #A 431, and #B 432 as well as information on IPI 190, 204, and 205 are recorded.

Also in the case where information is reproduced in unit of each reproduction sequence (PGC), the first displayed still images is automatically set as the representative image for each reproduction sequence (PGC).

Figure 4:
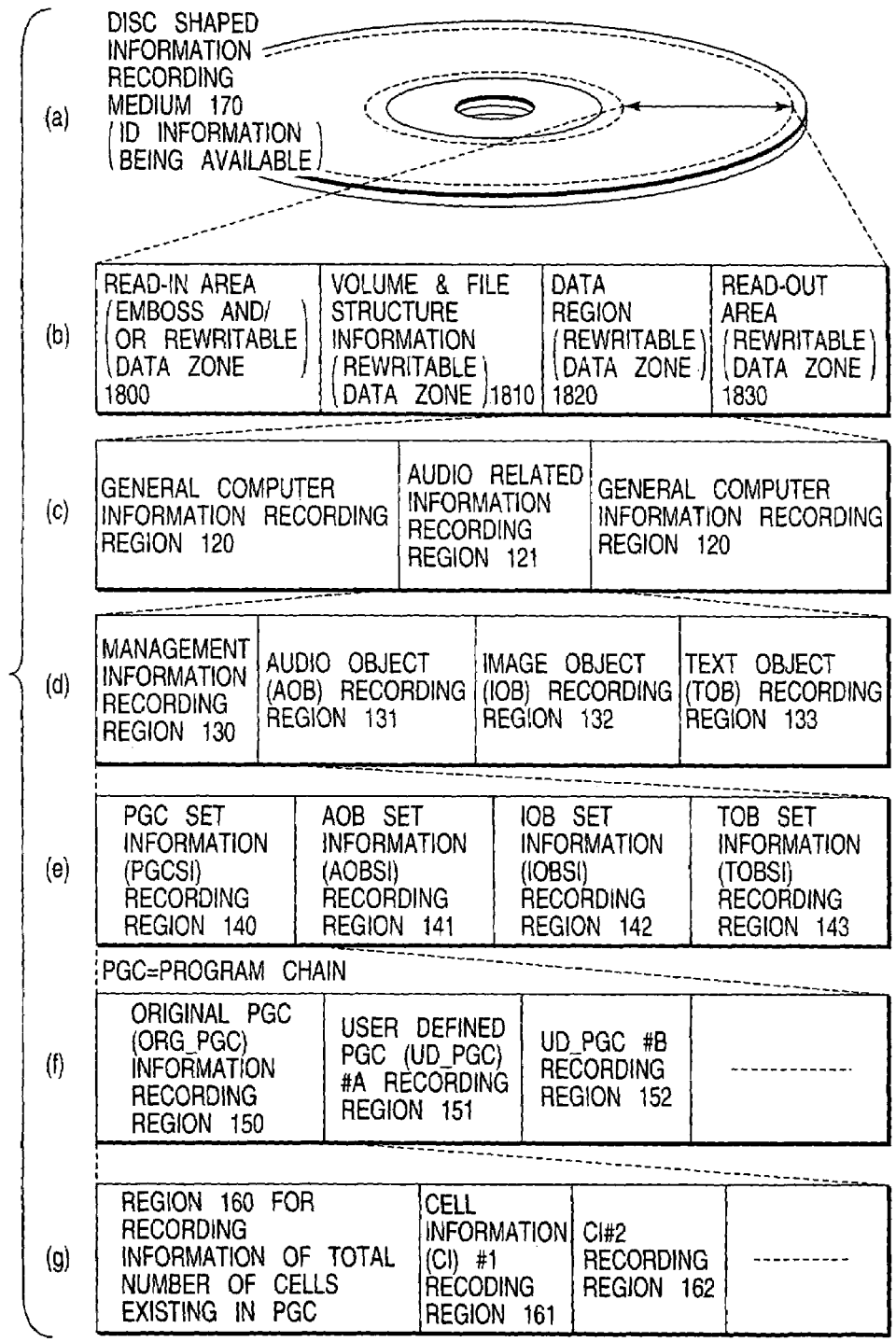
FIG. 4 is a view illustrating a recording formation of an optical disc that is an information storage medium according to another embodiment of the present invention.

In the case where the user select desired reproduction sequence (PGC), PGCSI recording region 140 in (e) of FIG. 3 or (e) of FIG. 4 is reproduced, the still image file indicative of the representative image for each PGC is reproduced, and text information items of TXI#Z 430, #A 431, and #B 432 shown in (a) of FIG. 2 are combined, so that the screen as shown in (d) of FIG. 2 is displayed.

In the embodiment of FIG. 2, still image file information displayed for each music number is described in, for example, IPI#2 of AOBI#2 ((b) of FIG. 1) which is reproduced first in the corresponding music number (e.g., #β in FIG. 1). (Note that in the embodiment of FIG. 14 which will be described later, the still image file information is described in IPI#2 provided in CI#2.)

FIG. 3 is a view illustrating a data structure (recording format) of information recorded in audio card (memory card) 100 that is an information storage medium according to one embodiment of the present invention.

The information storage medium (audio card or memory card) shown in FIG. 3 is card shaped in size equal to name card, planer gum or stamp. Electrodes (not shown in FIG. 3) for connection with an external device (not shown in FIG. 3) are provided at a predetermined position outside of this card 100. As described later, through these electrodes, information is input to or output from an information reproduction apparatus or information recording/reproducing apparatus (cf. FIG. 7) using card 100 shown in FIG. 3.

A main body of audio card or memory card 100 is composed of, for example, a semiconductor IC having a 64 MB flash memory (EEPROM) incorporated with a microcomputer and its peripheral devices.

As shown in (a) of FIG. 3, audio card 100 has a copy protection function, thus making it possible to prevent illegal copy or illegal use of the information recorded in audio card 100.

More specifically, audio card 100 itself features the following for an external device (information production apparatus or information recording/reproducing apparatus) independently:

(a) mutual authentication and encode key (encryption key) exchange;

(b) encoded (encrypted) information input/output; and (c) utilization of normal information (decoded or decrypted information) by a party (information reproduction apparatus or information recording/reproducing apparatus) only which has been successfully authenticated by audio card 100.

In addition to such mutual authentication processing and encode key (encryption key) exchange, control CPU (MPU) 101 in the audio card executes information encoding (encrypting) and/or information decoding (decrypting) as well as information input/output interface processing.

A program(s) for running control CPU in the audio card is(are) stored in ROM 102 provided for storing control program associated with authentication/key exchange and with I/O processing.

In the above information reproduction apparatus or information recording/reproducing apparatus (cf. FIG. 7), authentication and identification are performed by individual audio card 100, and the information transferred and input to each card 100 is managed for security.

As means for guaranteeing card-based information management performed by the information recording/reproducing apparatus, audio card 100 has its own unique ID and has a configuration in which a specific encode key (or specific encryption key) can be set.

More specifically, the specific ID (card manufacturer, product name, lot number, serial number, etc.) and the specific encode key (encryption key) information individually assigned to audio card 100 are recorded in recording region (RAM) 103 for the card specific ID information and key information.

Further, audio card 100 with the copy protection function has application data recording region (RAM) 104. In RAM 104, there can be recorded audio information (audio object AOB), still image information (image object IOB), text information (text object TOB), and management information (AOBSI.IFO, IOBSI.IFO, and TOBSI.IFO shown in FIG. 5) for managing these items of information.

As shown in (b) of FIG. 3, the inside of application data recording region (RAM) 104 is composed of boot information recording region 100, file allocation table (FAT) recording region 111, root directory internal information recording region 112, and data region 113.

Here, an FAT format is applied to the file format of data to be recorded in application data recording region (RAM) 104.

When audio card 100 with the copy protection function of FIG. 3 is inserted into an information recording/reproducing apparatus (cf. FIG. 7), this information recording/reproducing apparatus reads the information recorded in boot information recording region 110, and is booted (activated) automatically.

Thereafter, when the information recording/reproducing apparatus reproduces or plays back desired information (music and still image or the like) from card 100, the apparatus reads the file allocation information in FAT recording region 111 so as to recognize the storage address of the desired information to be reproduced. Based on this address, the apparatus accesses application data recording region (RAM) 104.

In data region 113, audio related information recording region 121 and one or more general computer information recording region(s) 120 can be arbitrary mixed and set as shown in (c) of FIG. 3.

As shown in (d) of FIG. 3, audio related information recording region 121 is composed of: management information recording region 130; audio object (AOB) recording region 131; image object (IOB) recording region 132; and text object (TOB) recording region 133.

The audio information recorded in audio card 100 is stored in AOB recording region 131, the still image information recorded in audio card 100 is stored in IOB recording region 132, and the text information recorded in audio card 100 is stored in TOB recording region 133.

The management information (e.g., map information) concerning these audio information, still image information and text information, and the management information (e.g., search pointer) indicative of the relationship between these items of information are stored in management information recording region 130.

The inside of management information recording region 130 is divided into four recording regions, as shown in (e) of FIG. 3.

More specifically, management information recording region 130 is composed of: program chain set information (PGCSI) recording region 140; audio object set information (AOBSI) recording region 141; image object set information (IOBSI) recording region 142; and text object set information (TOBSI) recording region 143.

PGCSI recording region 140 is composed of, as shown in (f) of FIG. 3, original PGC (ORG_PGC) information recording region 150 for storing original program chain information, and one or more user defined PGC (UD_PGC) recording regions 151, 152, . . . for storing program chain information newly defined by the user during use of card 100.

ORG_PGC information recording region 150 is composed of, as shown in (g) of FIG. 3, recording region 160 for information indicative of a total number of cells (information units configuring the PGC) existing in an original PGC, and one or more cell information (CI) recording regions 161, 162, . . . .

In audio card (memory card) 100 having the above data structure, the recording contents such as music information are stored in the predetermined places provided in recording regions 131 to 133 shown in (d) of FIG. 3. In addition, after the user has edited the stored recording contents (such as music combining, dividing, erasing, moving or the like), the management information (e.g., a method for reproducing the edited music number and the corresponding image and/or the corresponding text) is stored in the predetermined places provided in recording region 130 shown in (d) of FIG. 3.

According to the embodiment of the present invention, as memory card 100 with its copy protection function shown in FIG. 3, there is mainly proposed an audio card for recording audio information, image information, and/or text information protected from illegal copy and/or illegal use. However, memory card 100 shown in FIG. 3 is not limited to such audio information only, and can be utilized to record an application file (or PC data) such as a file of word processor or of spread sheet available for use in a general personal computer PC (the recording region for this purpose is denoted by reference number 120 in (c) of FIG. 3).

In this case, authentication/key exchange and I/O processing related control program stored in ROM 102 as well as card specific ID and key information stored in RAM 103, both shown in (a) of FIG. 3, may be properly utilized so that illegal copy and/or illegal use of an application file (or PC data) of word processor, spread sheet, game, or the like can be prevented.

Namely, memory card 100 shown in FIG. 3 can be utilized as package media for distributing (with or without charge) a computer program (application program, game program or the like) to be protected from illegal copy and/or illegal use.

FIG. 4 is a view illustrating a recording format of an optical disc that is an information storage medium according to another embodiment of the present invention.

Although audio card (memory card) 100 shown in (a) of FIG. 3 is a card shaped medium in which the medium itself does not move mechanically while in use, medium 170 shown in (a) of FIG. 4 is a disc shaped medium in which the medium itself rotationally moves while in use.

Specific examples of disc shaped medium 170 capable of recording and reproducing include: hard disc HDD (in particular, HDD having its removable recording medium portion); a large capacity floppy disc drive FDD (in recent years, floppy discs of 100 MB or more in capacity is commercially available); a magneto-optical disc MO; DVD-RAM, DVD-R, DVD-RW, and the like.

Although the FAT format is adopted as a HDD or MO file format described by referring to (b) of FIG. 3, a universal disc format (UDF) is adopted for DVD-RAM, DVD-R, or DVD-RW.

Here, a data structure of disc shaped medium 170 will be described on the assumption of the DVD family disc (for example, recording and reproducing DVD audio disc) adopting the UDF format.

That is, read-in area 1800 is disposed at the inner periphery of disc shaped medium 170, and read-out area 1830 is disposed at the outer periphery thereof. Volume and file structure information 1810 and data region 1820 are disposed therebetween. Each of these areas 1800 and 1830 and regions 1810 and 1820 contains a rewritable data zone.

Rewritable data region 1820 shown in (b) of FIG. 4 has a hierarchical data structure as shown in (c) to (g) of FIG. 4. This data structure is the same as that described by referring to (c) to (g) of FIG. 3.

Figure 5:
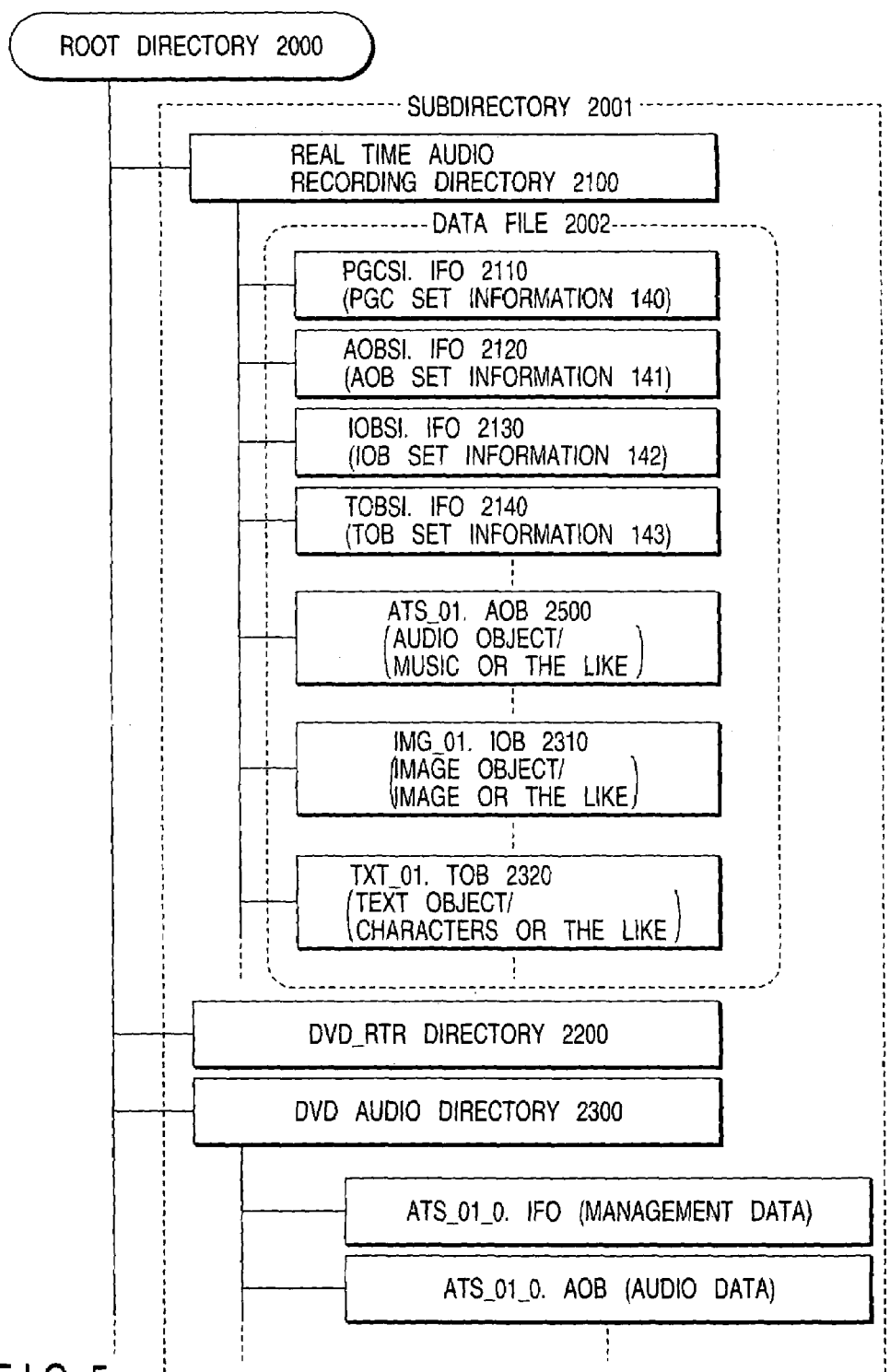
FIG. 5 is a view illustrating a directory configuration (hierarchical structure of a recording file) of a variety of information stored in the information storage medium shown in FIG. 3 or FIG. 4.

In the case of providing access to the information (for example, a file with the directory structure as shown in FIG. 5 described later) recorded in disc shaped medium 170, volume and file structure information 1810 is first reproduced. This volume and file structure information 1810 contains UDF information for providing access to the data file as shown in FIG. 5.

FIG. 5 is a view illustrating the directory structures (recording file hierarchical structures) of a variety of information stored in memory card 100 shown in FIG. 3 adopting FAT or in disc shaped medium 170 shown in FIG. 4 adopting UDF.

The information recorded in application data recording region (RAM) 104 shown in (a) of FIG. 3 has a directory hierarchical structure as shown in FIG. 5, and the information contained in root directory 2000 shown in FIG. 5 is recorded in information recording region 112 provided in the root directory shown in (b) of FIG. 3.

Alternatively, the information recorded in data region 1820 shown in (b) of FIG. 4 has a directory hierarchical structure as shown in FIG. 5; and the information contained in root directory 2000 shown in FIG. 5 is recorded in volume and file structure information 1810 shown in (b) of FIG. 4.

Even in the case where audio card 100 with the copy protection function adopting the FAT format is used as an information storage medium as shown in FIG. 3, or even in the case where disc shaped information storage medium 170 adopting the UDF format as shown in FIG. 4 is used, information to be recorded in the information storage medium is recorded in unit of files, as shown in FIG. 5.

The audio information (AOB) with the still image (IOB) having been described with reference to FIGS. 1 and 2 is collectively recorded in sub-directory 2001, called real-time audio recording directory 2100, as shown in FIG. 5.

This real-time audio recording directory 2100 has data file 2002 containing following files 2110 to 2140, 2310, 2320, 2500, . . . as a sub-directory.

The audio information (audio object AOB) to be recorded in the information storage medium shown in FIG. 3 or FIG. 4 is recorded in unit of files such as ATS_01.AOB 2500, . . . , as shown in FIG. 5. Details of audio object file (audio information file) 2500 will be described later.

This audio information file (ATS_01.AOB 2500, . . . ) is recorded and stored in audio recording region 131 shown in (d) of FIG. 3 or (d) of FIG. 4.

In addition, the image information (image object IOB) to be recorded in the information storage medium shown in FIG. 3 or FIG. 4 is recorded as another file such as IMG_01.IOB 2310, . . . . for every image (still picture), as shown in FIG. 5.

These image information file (IMG_01.IOB 2310, . . . ) is recorded and stored in image object recording region 132 shown in (d) of FIG. 3 or (d) of FIG. 4.

Further, in the information storage medium shown in FIG. 3 or FIG. 4, text information (text object TOB) such as words for audio information (performed music), item description of performed music, or introduction of performer can also be recorded in unit of files such as TXT_01.TOB 2320, . . . , as shown in FIG. 5.

These text information files (TXT_01.TOB 2320, . . . ) are recorded and stored in text object recording region 133 shown in (d) of FIG. 3 or (d) of FIG. 4.

All of the management information concerning the audio information (audio object AOB) recorded in audio object recording region 131 is collectively recorded in one file 2120 named AOBSI.IFO, as shown in FIG. 5. The recording place of this AOBSI.IFO file 2120 corresponds to audio object set information AOBI recording region 141 in (e) of FIG. 3 or (e) of FIG. 4.

In addition, the management information concerning still image information (image object IOB) recorded in image object recording region 132 is collectively recorded in file 2130 called IOBSI.IFO. The recording place of this IOBSI.IFO file 2130 corresponds to image object set information recording region 142 in (e) of FIG. 3 or (e) of FIG. 4.

Similarly, the management information concerning text information (text object TOB) recorded in text object recording region 133 is collectively recorded in file 2140 called TOBSI.IFO. The recording place of this TOBSI.IFO file 2140 corresponds text object set information recording region 143 in (e) of FIG. 3 or (e) of FIG. 4.

Even in the case where any form of audio card 100 with a copy protection function and disc shaped information storage medium 170 is employed, all of the management information indicative of the reproduction sequence concerning all audio information (All AOBs) recorded in the information storage medium is collectively recorded in one file 2110 named PGCSI.IFO, as shown in FIG. 5. The recording place of this PGCSI.IFO file 2110 corresponds to program chain set information recording region 140 in (e) of FIG. 3 or (e) of FIG. 4.

Here, the program chain (PGC) is composed of one or more cells C as described later, and is structured so that the reproduction sequence of music numbers in PGC can be defined depending on the arrangement order of cells C.

When data of real-time recording/reproducing DVD video (DVD_RTR) is recorded in the data region of the medium shown in FIG. 3 or FIG. 4, DVD_RTR directory 2200 containing DVD_RTR data file(s) is provided as a sub-directory of root directory 2000 shown in FIG. 5.

In addition, when DVD audio data is recorded in the data region of the medium shown in FIG. 3 or FIG. 4, DVD audio directory 2300 containing DVD audio data file(s) (ATS_01.IFO, ATS_01.AOB, or the like) is provided as a sub-directory of root directory 2000 shown in FIG. 5.

Audio object (AOB) file 2500 shown in FIG. 5 is recorded or stored in audio object recording region 131 shown in (d) of FIG. 3 or (d) of FIG. 4.

As shown in FIG. 5, still image information (IOB) to be recorded in the information storage medium is recorded for each still image as a separate file such as IMG_01.IOB 2310, . . . These still image information files are recorded and stored in IOB recording region 132 shown in (d) of FIG. 3 or (d) of FIG. 4.

Although not shown in FIG. 5, text information such as word information relevant to audio information is recorded in unit of file, and is recorded and stored in text object recording region 133 shown in (d) of FIG. 3 or (d) of FIG. 4.

Management information concerning audio information, still image information, and text information, and/or management information indicative of a relationship between items of respective information are recorded in management information recording region 130 shown in (d) of FIG. 3. The inside of this management information recording region 130 is divided into four recording regions, as shown in (e) of FIG. 3 or (e) of FIG. 4.

That is, all of the management information concerning audio information (AOB) recorded in audio object recording region 131 is collectively recorded in one file named AOB-SI.IFO 2120, as shown in FIG. 5.

This AOBSI.IFO 2120 file is recorded and stored in AOBSI recording region 141 shown in (e) of FIG. 3 or (e) of FIG. 4.

The management information concerning the still image information (IOB) recorded in IOB recording region 132 is collected in IOBSI.IFO 2130 file, and is recorded and stored in IOBSI recording region 142.

In addition, the management information concerning the text information (TOB) recorded in text object recording region 133 is collected in TOBSI.IFO 2140 file, and is recorded and stored in TOBSI recording region 143.

Even in any case of audio card 100 with its copy protection function or disc shaped information storage medium 170, all of the management information indicative of the reproduction sequences concerning all audio information (AOB) recorded in the information storage medium is collectively recorded in one file named PGCSI.IFO 2110, as shown in FIG. 5. The region having this one file recorded therein is referred to as PGCSI recording region 140.

Figure 6:
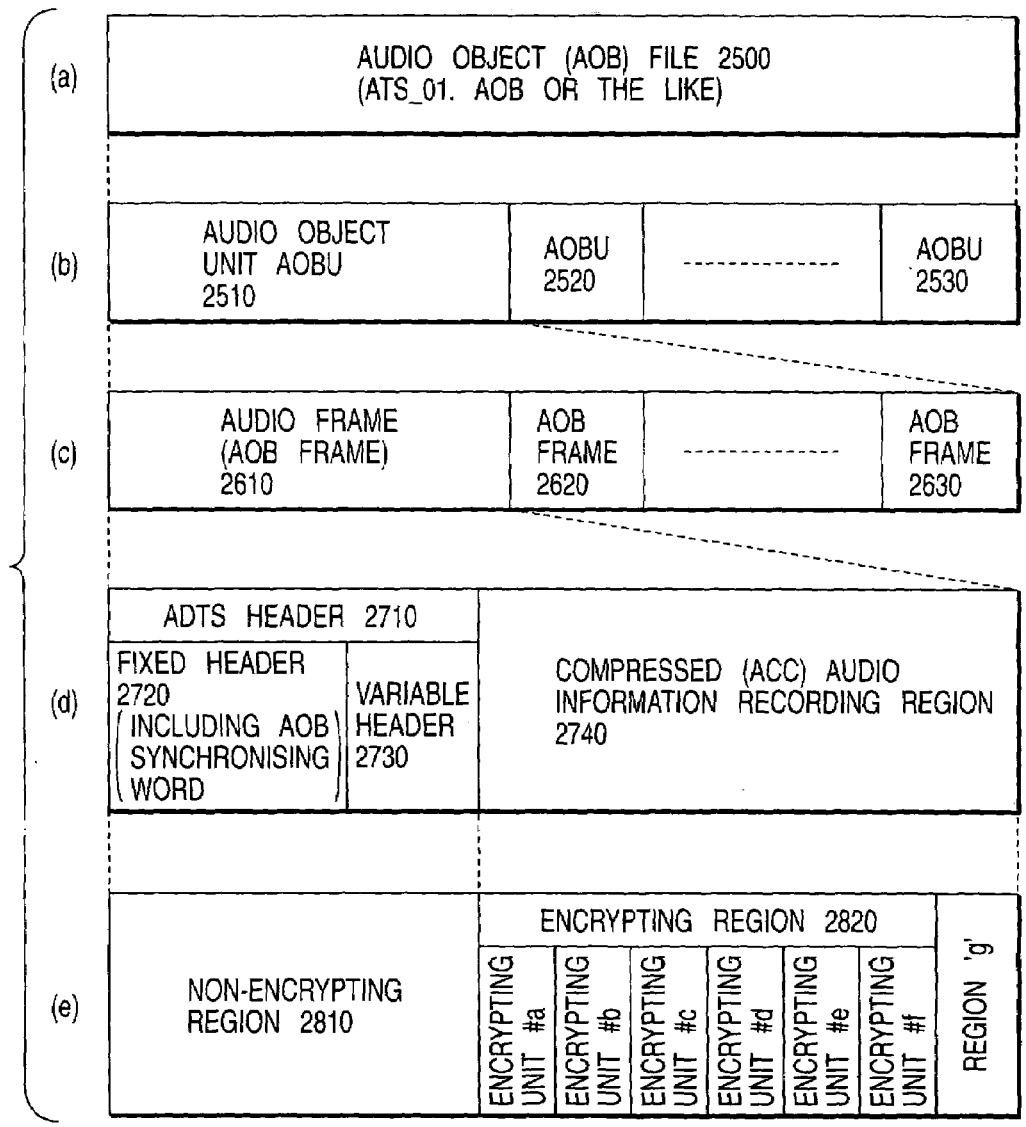
FIG. 6 is a view illustrating an example of a format (data structure) when audio information encoded in the audio card with its copy protect function shown in FIG. 3 is recorded.

FIG. 6 is a view illustrating an example of a format (data structure) wherein encrypted audio information is recorded in, for example, the audio card with copy protect function shown in FIG. 3.

The inside of AOB file 2500 shown in FIG. 5 has an internal structure as shown in FIG. 6.

Hereinafter, a data structure in audio object file 2500 ((a) of FIG. 6) according to the embodiment of the present invention will be described.

The audio information (audio object AOB) is composed of audio object units AOBU 2510 to AOBU 2530 ((b) of FIG. 6).

These units (AOBU 2510 to AOBU 2530) are configured based on:

(01) dividing by specific data size (32 k bytes, 16 k bytes, 512 bytes, etc.) to provide divided units;

(02) dividing by a specific number of audio frames to provide divided units;

(03) dividing by reproduction time (0.2 second, one second, 2 seconds, 5 seconds, 10 seconds, etc.) to provide divided units; and so on In the embodiment of the present invention, MPEG AAC system (advanced audio coding) is adopted for audio information compression.

As shown in (c) of FIG. 6, audio object file 2500 is composed of a set of plural audio frames 2610 to 2630.

The number of audio frames contained in each audio object file 2500 is described in audio object information AOBI. Therefore, the "total number of frames for each music number" can be obtained by utilizing information relating to AOBI and the corresponding music number described in cell information CI.

The information of the "total number of frames for each music number" is recorded in audio object information (for example, AOBI#2-172 in music number #β) corresponding to the audio information file to be reproduced first in the music.

In the AAC system, each inside of audio frames (AOB frames) 2610 to 2630 shown in (c) of FIG. 6 is composed of ADTS (advanced audio coding transport stream; or audio data transport stream) header 2710 and compressed audio information recording region 2740 shown in (d) of FIG. 6.

Further, ADTS header 2710 is composed of fixed header 2720 including AOB synchronizing words and variable header 2730 as shown in (d) of FIG. 6.

In a method for encrypting audio information (AOB), as shown in (e) of FIG. 6, the contents of ADTS header 2710 are placed in non-encrypting region 2810 (in a plain state being free from encrypting), whereas encrypting is sequentially done from the head position of compressed audio information recording region 2740 by encrypting units (#a to #f).

For example, computation processing is performed to the data in encrypting units (#a to #f) in accordance with an encryption key generated based on random numbers, and the computation result is recorded as encrypting information. Encrypting is performed in these encrypting units (#a to #f), and the computation processing based on the above encryption key is repeated by encrypting units (#a to #f).

In the embodiment of the present invention, the encrypting units (#a to #f) are defined in units of 64 bits or 56 bits. The size of compressed audio information recording region 2740 does not always coincide with a multiple of 64 bits. For this reason, in compressed audio information recording region 2740, only region "g" that is a remainder (a fractional portion) caused by dividing a multiple of encrypting units is maintained in a plain state being free from encrypting.

Namely, the non-encrypting region "g" is provided as a sort of a padding area for ensuring that the size of compressed audio information recording region 2740 is made coincident with a multiple of 64 bits.

Incidentally, encrypting region 2820 is formed of the encrypting units (#a to #f), and compressed audio information recording region 2740 is formed of encrypting region 2820 and the padding region "g".

Figure 7:
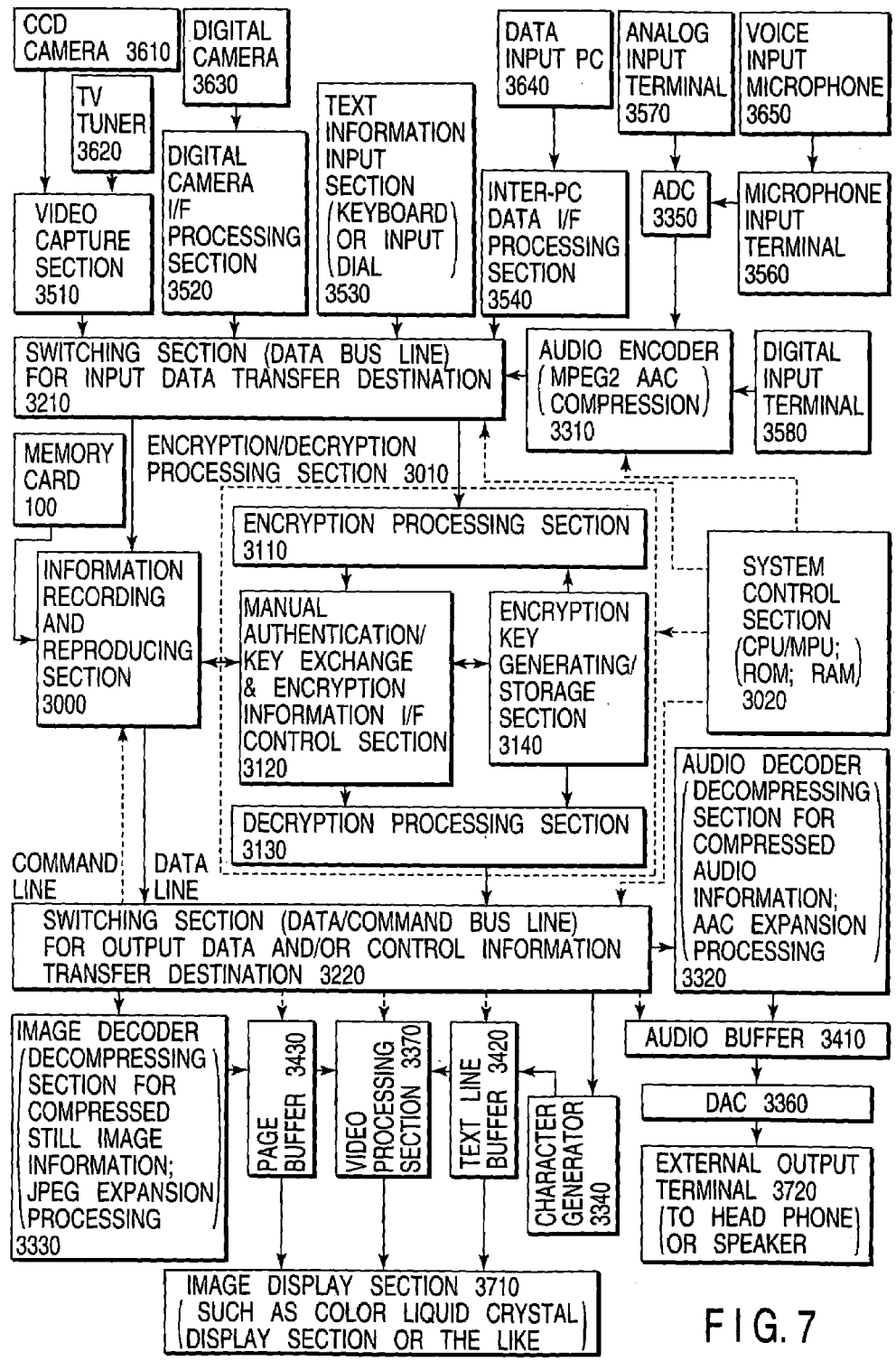
FIG. 7 is a block diagram illustrating an exemplary configuration of an apparatus for recording or reproducing information in or from the audio card with its copy protect function shown in FIG. 3.

FIG. 7 is a block diagram illustrating an example of an apparatus for recording or reproducing information for audio card (memory card) 100 with copy protect function shown in FIG. 3.

First, a configuration of a recording system capable of writing into audio card (memory card) 100 the information (audio information and/or still picture information) to be copy protected will be described.

A digital camera is a popular device that digitally records still image information handled by the apparatus shown in FIG. 7. In addition to such a digital camera, still image information to be digitally recorded is utilized for menu images or the like in a DVD video system for digitally recording/reproducing movie information (I picture of MPEG can be regarded as still image information).

As means for inputting such still image information into the apparatus shown in FIG. 7, there are:

(11) means for capturing into video capture section 3510 an video signal from CCD camera 3610 or TV tuner 3620 to convert a still image, and then, converting into a digital signal the still image captured by an A/D converter (not shown) incorporated in video capture section 3510, to thereby input the digital signal to switching section (data bus line) 3210 for input data transfer destination;

(12) means for transmitting the still image information photographed by digital camera 3630 to I/F processing section 3520 for the digital camera, using, for instance, a serial transmission line such as RS-232C, so that the transmitted information is supplied to input data transfer destination switching section 3210; and

(13) means for supplying, via inter-PC data I/F processing section 3540, input data transfer destination switching section 3210 with the still image information (such as computer graphics) produced by personal computer (PC) 3640 or the still image information captured by an image scanner (not shown) connected to this PC.

Further, as means for inputting text information into the apparatus shown in FIG. 7, there are:

(14) means (3530) for inputting key input data from a keyboard to input data transfer destination switching section 3210; and

(15) means (3530) for selecting and specifying character(s) by a dialing/dial-in device utilized in a digital camera recorder, etc., so that character codes such as JIS or ASCII are input to data transfer destination switching section 3210.

Still further, as means for inputting audio information into the apparatus shown in FIG. 7, there are:

(16) means for digitizing by ADC 3350 an analog audio signal (for example, an analog reproduction/playback output of a CD player) externally inputted via analog input terminal 3570, and subjecting the digitized data to, for example, MPEG2/AAC compression coding by audio encoder 3310 so as to input the coded data to input data transfer destination switching section 3210 (note that it can be determined by an instruction from system control section 3020 as to whether or not compression is performed by audio encoder 3310 or as to what compression system is adopted if compression is done);

(17) means for digitizing by ADC 3350 an analog audio signal inputted from voice input microphone 3650 via a microphone input terminal 3560, and subjecting the digitized data to MPEG2/AAC compression coding by audio encoder 3310 so as to input the coded data to input data transfer destination switching section 3210;

(18) means for subjecting to MPEG2/AAC compression coding by audio encoder 3310 a digital audio signal (for example, linear PCM digital output from a CD player) externally inputted via a digital input terminal 3580, and inputting the coded data to input data transfer destination switching section 3210; and

(19) means for directly capturing already-compressed digital audio information through WWW (World Wide Web) or Internet using a modem (not shown) and data input PC 3640, and inputting the captured data to input data transfer destination switching section 3210 via inter-PC data I/F processing section 3540.

Desired information (for example, JPEG compression still picture information from digital camera 3630, and MPEG compression audio information from audio encoder 3310) is selected from a variety of digital information inputted by the above method under the control of system control section 30020.

Then, the selected information (JPEG compression still picture information and MPEG compression audio information) is transferred to an information recording and reproducing section 3000 through input data transfer destination switching section (data bus line) 3210.

For the audio input information or still image information transferred to information recording and reproducing section 3000, information of analog copy generation management system CGMS-A may be accompanied in the case of an analog input signal; and information of digital copy generation management system CGMS-D may be accompanied in the case of a digital input signal.

When information (2-bit flag) of "any frequent copying enabled, or copy-free" is described as the information of the copy generation management system CGMS, encode processing is not required. Then, the input information is transferred from input data transfer destination switching section 3210 to information recording and reproducing section 3000, while the transferred input information is in a plain state being free of encrypting.

On the other hand, in the case where copy limitation is specified by CGMS-A or CGMS-D, the copy limited information is transferred from input data transfer destination switching section 3210 to encryption processing section 3110.

At encryption processing section 3110, copy limited information is encrypted based on the encryption key generated randomly by encryption key generating/storage section 3140 (refer to (e) of FIG. 6 for the encrypting method).

The audio information and/or still image information encrypted by encryption processing section 3110 are/is transferred to mutual authentication/key exchange & encryption information I/F control section 3120.

From mutual authentication/key exchange & encryption information I/F control section 3120, the encrypted audio information and/or encrypted still image information are/is transferred to information recording and reproducing section 3000. The information transferred to information recording and reproducing section 3000 is accompanied with CGMS-A or CGMS-D copy limitation information (2-bit flag) as needed.

When the information of "only one generation copy enabled" is described as CGMS information, the encryption decode key (or decryption key) is accompanied with this CGMS information, and the encrypted audio input information as well as the decryption key with the CGMS information are transferred from mutual authentication/key exchange & encryption information I/F control section 3120 to information recording and reproducing section 3000.

When the information of "copying disabled, or copy never" is described as CGMS information, the encrypted audio input information without the decryption key is transferred from mutual authentication/key exchange & encryption information I/F control section 3120 to information recording and reproducing section 3000, together with the CGMS information.

Alternatively, in the case where the information of "copying disabled, or copy never" is described as CGMS information, only a warning message such as "this program is copyright reserved, and copying or recording is prohibited" may be transferred from mutual authentication/key exchange & encryption information I/F control section 3120 to information recording and reproducing section 3000, so that any recording cannot be made, except for recording of the above warning.

The above CGMS information (2-bit flag indicative of copy limitation type or warning message for copyright reserved) can be written into card specific ID & key information recording region (RAM) 103 of audio card (memory card) 100 shown in (a) of FIG. 3, for example.

Alternatively, in optical disc 170 shown in (a) of FIG. 4, for example, the above CGMS information (2-bit flag indicative of copy limitation type or warning message for copyright reserved) can be written into the rewritable data zone of read-in area 1800 or into management information recording region 130 shown in (d) of FIG. 4.

The operation (a selectable encrypting operation according to the contents of CGMS information) of the above encryption processing related portions (3110 to 3140) is controlled by system control section 3020.

More specifically, information recording and reproducing section 3000 comprises:

(21) a contact type electrode portion in the case where the information storage medium is an audio card (memory card) 100;

(22) an HDD internal magnetic head and an HDD rotation control circuit in the case where the information storage medium is a removable hard disc; and

(23) an optical head and a disc rotation control circuit in the case where the information storage medium is an optical disc capable of recording and reproducing (in FIG. 7, there is shown a case in which memory card 100 is employed).

A description of the configuration shown in FIG. 7 will be continued, assuming that the CGMS copy managed audio information and/or still picture information is recorded/ reproduced for audio card (memory card) 100.

At the same time, mutual authentication processing and key exchange processing between audio card (memory card) 100 and the apparatus shown in FIG. 7 will be described in parallel.

When audio card (memory card) 100 shown in (a) of FIG. 3 is loaded (by the user) to information recording and reproducing section 3000 shown in FIG. 7, card 100 is powered from information recording and reproducing section 3000 side via card electrodes (not shown).

Then, an authentication/key exchange & I/O processing related program stored in ROM 102 shown in (a) of FIG. 3 is started by control CPU/MPU 101 in card 100.

By means of this program, mutual authentication and key exchange are executed between encryption/decryption processing section 3010 and audio card 100.

More specifically, in the process of authentication processing/key exchange, a challenge key is generated by encryption key generating/storage section 3140, and the generated key is encrypted (encoded) by encryption processing section 3110. Then, the encrypted key is sent to audio card 100 via mutual authentication/exchange & encryption information I/F control section 3120. Then, the encrypted challenge key is decrypted and authenticated in audio card 100.

Further, a response key stored in RAM 103 of the card specific ID information & key information recording region is encrypted and sent to encryption/decryption processing section 3010. Then, the encrypted response key is decrypted and authenticated in encryption processing section 3110.

In these authentication processes, the counterpart ID is mutually checked.

For example, CPU/MPU 101 of card 100 shown in (a) of FIG. 3 reads the ID being specific to the apparatus shown in FIG. 7 via information recording and reproducing section 3000 (this ID is written in advance in a ROM (not shown) in information recording and reproducing section 3000). By so doing, it is possible to check whether or not the apparatus normally matches its identity (card 100).

Similarly, system control section 3020 shown in FIG. 7 reads the ID being specific to card 100 shown in (a) of FIG. 3 via information recording and reproducing section 300, thereby making it possible to check whether or not the card normally matches its identity (apparatus of FIG. 7).

In this way, mutual authentication between card 100 and the apparatus shown in FIG. 7 is performed.

If the above mutual authentication fails, the subsequent processing is canceled, and no information is recorded into or reproduced from card 100.

When the above authentication is done successfully (or when the authentication is OK), a common encryption key (or common encryption/decryption key), which is common to audio card 100 and encryption/decryption processing section 30110, is generated based on random numbers or the like. Then, the common encryption key (decryption key) information is temporarily stored in both of RAM 103 of the card specific ID information & key information recording region and the encryption key generating/storage section 3140.

In this way, both of card 100 and the apparatus shown in FIG. 7 have common key information required for the decryption.

When a series of the above mutual authentication/key exchange processing is completed, encryption processing section 3110 encrypts digital information (voice/audio information or picture/image information) sent from input data transfer destination switching section 3210, by utilizing the generated common encryption key.

In this encoding, encrypting conversion (e.g., shuffling randomly in encrypting units) is effected by encrypting units (64 bits) on compressed audio information recording region 2740, as shown in (d) and (e) of FIG. 6, and thus the data is re-written.

At that time, no encrypting conversion is performed for ADTS header 2710 section and the region "g" of the fractional portion. The data (contents of ADTS header 2710 and region "g"), not being subjected to the encrypting conversion and kept in a plain state free of encrypting, is transferred to information recording and reproducing section 3000.

Then, the encrypted digital information is transferred to card 100, and is recorded into a predetermined portion of data region 113 of card 100.

Here, in the case where the information to be copyright reserved is recorded in card 100, the CGMS-D information is transferred and recorded simultaneously.

On the other hand, when the encrypted information is reproduced, data (voice/audio information or picture/image information) being subjected to the encrypting conversion in encrypting units as well as data of encrypting free ADTS header 2710 portion and the region "g" portion are transferred from card 100 to encryption/decryption processing section 3010 via information recording and reproducing section 3000.

Then, the transferred, encrypting-converted data are decrypted by decryption processing section 3130, and is transferred to output data/control information transfer destination switching section (data/command bus line) 3220.

The above-mentioned encrypting-converted data contains the CGMS-D information if it is copyright reserved.

Hereinafter, an example of reproduction processing will be described in more detail.

In the case of reproducing information recorded in audio card 100 with the copy protection function, information recording and reproducing section 3000 reads the information in program chain set information recording region 140 shown in (e) of FIG. 3. After at least part of the read information has been stored in the memory section (RAM) provided in system control section 3020, an audio information file to be reproduced is searched using the information temporarily stored in the memory section.

Before reproducing the audio information file, information of CGMS-D related to the audio information is read. Then, it is determined by system control section 3020 whether the read information is directly transferred to output data/control information transfer destination switching section 3020 or the read information is transferred to this section 3020 via encryption/decryption processing section 3010. Then, either one of the transfer routes is selected according to the result of determination done by system control section 3020.

In the case where the encrypted information is transferred from information recording and reproducing section 3000, the processing of mutual authentication/key exchange is performed. Then, a common encryption key is held by both of encryption/decryption processing section 3010 and audio card 100.

The encrypted information inputted to decryption (decode) processing section 3130 via mutual authentication/key exchange & encryption information I/F control section 3120 has a structure as shown in (e) of FIG. 6.

This encrypted information is decrypted (decoded) by decryption processing section 3130 in encrypting units based on the common encryption key, and the decrypted plain information is re-arranged in encrypting units so as to retrieve its original data arrangement.

The (decrypted, plain) digital information transferred from output data/control information transfer destination switching section (data/command bus line) 3220 may be processed as follows.

(31) Audio information is decoded by audio decoder 3220, and is returned to a linear PCM signal. Then, the linear PCM signal is temporarily stored in audio buffer 3410.

(32) Text information is subjected to character-conversion (conversion of codes to characters) by character generator 3340, and the converted characters are temporarily stored as image information in text line buffer 3420.

(33) Still image information, compressed by JPEG or MPEG (I picture) or the like, is converted into bit map information in image decoder 3330, and the converted bit map information is temporarily stored in page buffer 3430.

(34) Still image information in bit map format temporarily stored in page buffer 3430 is combined, as needed, with text information image temporarily stored in line buffer 3420 by means of video processor section 3370, so that one combined image is generated.

Thus obtained combined image is properly displayed at image display section 3710 such as color liquid crystal panel.

On the other hand, audio information temporarily stored in audio buffer 3410 is transferred by each frame to D/A converter (DAC) 3360, and the transferred audio information is converted into an analog signal. Then, the converted analog signal is supplied to external output terminal 3720 to which connected is an amplifier for driving a speaker or the like.

Incidentally, display timing at image display section 3710 for text or still image information during reproduction of audio information can be controlled in synchronism with the reproduced audio frame number.

At system control section 3020 shown in FIG. 7, for example, a value obtained by dividing "total number of frames" of music number #β by "number of still images displayed during reproduction" is set as "number of audio frames to be reproduced per still image".

The audio frame number being reproduced (or the accumulated number of audio frames) is always monitored at system control section 3020. When the reproduced audio frame number reaches its predetermined value, the still image information in page buffer 3430 to be transferred to image display section (color liquid crystal display) 3710 is changed.

Any of the aforementioned "combining music" and "dividing music" can be mainly done by system control section 3020 shown in FIG. 7. The changed management information (CI# or AOBI#) is transferred to information recording and reproducing section 3000 via output data/control information transfer destination switching section (data/command bus line) 3220.

As a result, the information in management information recording region 130 shown in (d) of FIG. 3 is rewritten. In addition, during "dividing music" processing, the information contained in audio object recording region 131 is changed.

When optical disc 170 shown in FIG. 4 is employed for information recording and reproducing section 3000 shown in FIG. 7, unlike memory card 100, disc 170 does not have control CPU/MPU 101. In this case, the aforementioned processing of mutual authentication/key exchange can be performed at the side of mutual authentication/key exchange & encryption information I/F control section 3120.

More specifically, when disc 170 is inserted into information recording and reproducing section 3000, mutual authentication/key exchange & encryption information I/F control section 3120 inquires disc 170 for the disc specific ID.

Then, disc 170 answers its own ID (disc manufacturer, product name, lot number, serial number or the like) recorded in read-in area 1800, etc. shown in (b) of FIG. 4.

On the other hand, the mutual authentication/key exchange & encryption information I/F control section 3120 has an internal ROM (not shown) containing an ID table for the available medium(s). This section 3120 checks whether or not the internal ID table contains available medium information corresponding to the disc specific ID answered from disc 170. If the internal ID table contains information that matches the disc specific ID, then mutual authentication is established between disc 170 and the apparatus shown in FIG. 7.

More specifically, when optical disc 170 is loaded (by the user) to information recording and reproducing section 3000 shown in FIG. 7, mutual authentication/key exchange & encryption information I/F control section 3120 reads the ID of disc from, for example, read-in area 1800 of optical disc 170, and checks the counterpart by referring to its own ID table, etc. of the apparatus shown in FIG. 7.

The subsequent processing may be similar to a case wherein memory card 100 is employed, except for the fact that the subsequent processing is executed on the side of mutual authentication/key exchange & encryption information I/F control section 3120 shown in FIG. 7.

The procedures for displaying and searching images using a representative image according to the present invention will be described as follows.

<01> The user issues an instruction of "Menu display" to the information recording and reproducing apparatus as shown in FIG. 7.

<02> System control section 3020 issues an instruction to information recording and reproducing section 3000, so that the information of original PGC information recording region 150 is reproduced and an AOBI number at the reproduction start position of each music number is checked.

<03> System control section 3020 issues an instruction to information recording and reproducing section 3000, so that the corresponding AOBI (#1, #2, #5) contained in AOBSI recording region 141 shown in (e) of FIG. 3 is reproduced and a still image file number of the representative image of each music number is checked from IPI (#1, #2, #5).

<04> At the same time, text information TXI (#1, #2, #5) contained in the corresponding AOBI (#1, #2, #5) is reproduced.

The reproduced text information is sent to character generator 3340, via information recording and reproducing section 3000 and output data/control information transfer destination switching section (data/command bus line) 3220 shown in FIG. 7, and is converted into character information by character generator 3340. Then, the converted character information is temporarily stored in text line buffer 3420.

<05> Based on the information acquired in the above "<3>", system control section 3020 issues an instruction to information recording and reproducing section 3000 so as to reproduce the corresponding still image in IOB recording region 132 shown in (d) of FIG. 3 or (d) of FIG. 4.

<06> The thus reproduced still image information file set as a representative image is sent to image decoder 3330, via information recording and reproducing section 3000 and output data/control information transfer destination switching section (data/command bus line) 3220, and is decoded in image decoder 3330. Then, the decoded file (representative image) is temporarily stored in page buffer 3430.

<07> The still image information decoded by video processor section 3370 shown in FIG. 7 is combined with text information items such as music title, singer'name, and the like, each recorded in the text information, and with music number information. As shown in (d) of FIG. 1, still images obtained by combining the "music number", "text information (music title)", etc. are displayed in line on the display screen of image display section 3710.

<08> When a particular music number to be reproduced is selected on the display screen of display section 3710 by the user's cursor operation, system control section 3020 goes back to the corresponding AOBI (for example, AOBI #2) to reproduce the corresponding audio information file (for example, ATS_02.AOB), so that an audio output is obtained from external output terminal (speaker) 3720.

Figure 8:
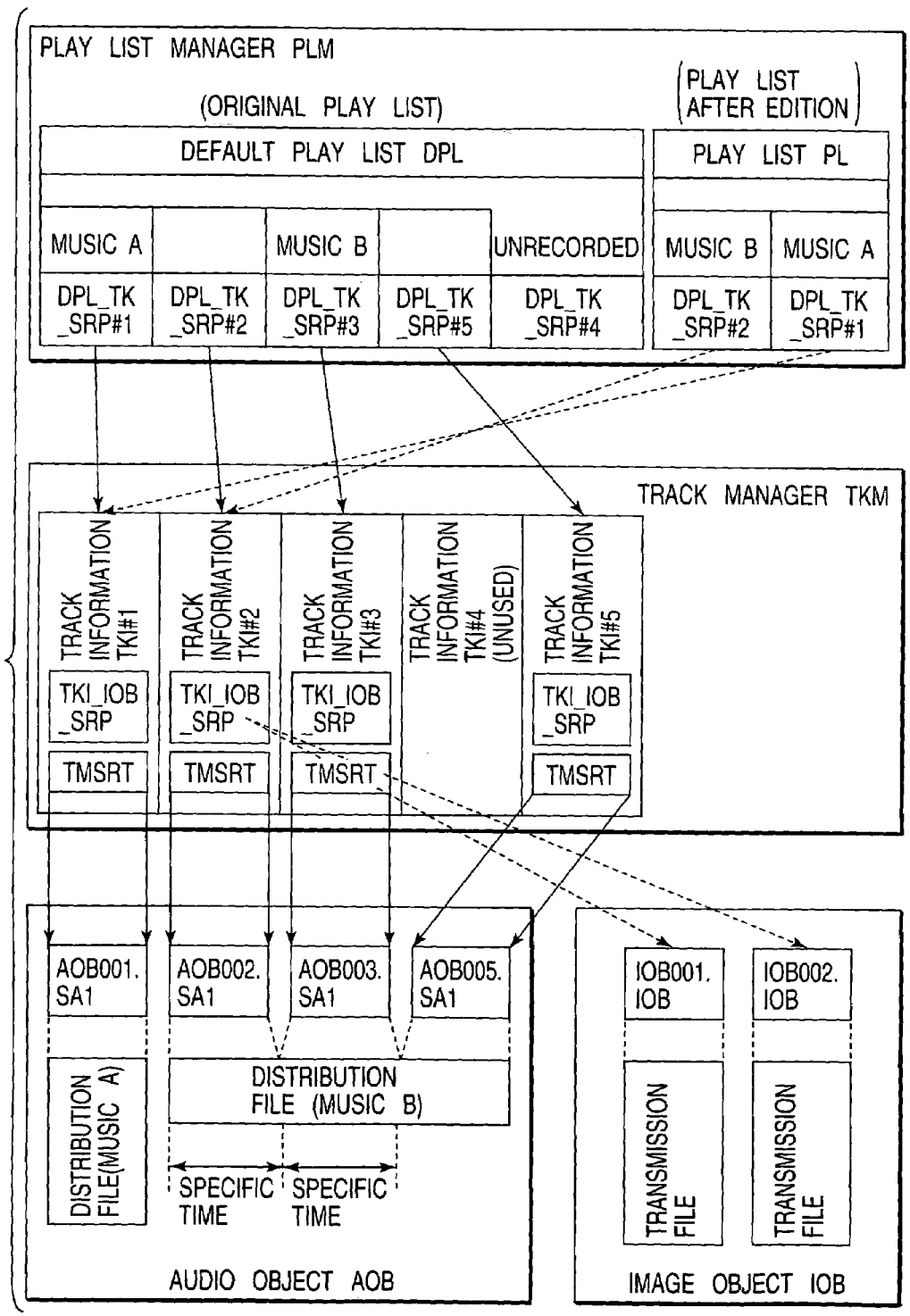
FIG. 8 is a view illustrating a reproduction relationship (dotted line arrow shown in the figure) between a plurality of music numbers and still images accompanied with these music numbers when cell information (CI#) is reread to a track search pointer (DPL_TK_SRP#); audio object information (AOBI#) is reread to track information (TKI#); and image pointer information (IPI#) is reread to track information search pointer (TKI_IOB_SRP) for an image object.

FIG. 8 is a view illustrating a reproduction relationship (dashed line arrows shown in the figure) between a plurality of music numbers and still images accompanied with these music numbers, provided that the cell information (CI#) is reread to the track search pointer (DPL_TK_SRP#); the audio object information (AOBI#) is reread to track information (TKI#); and the image pointer information (IPI#) is reread to the track information search pointer (TKI_IOB_SRP) for the image object.

The information reproduction relationship can be applied to FIG. 8 by rereading the following terms (replacement on interpretation of terms):
PGC set information→play list manager PLM;
Original PGC→default play list DPL;
Individual user defined PGC→individual play list PL;
Cell information CI→track search pointer DPL_TK_SRP of the default play list;
Audio object information AOBI→track information TKI;
Cell information CI→track information TKI;
Image pointer information IPI→track information image object search pointer TKI_IOB_SRP; and
Time map information TMI→time search table TMSRT.

In the configuration shown in FIG. 8, if the playing time of music number #B is long, the AOB file of such long music number #B may be automatically divided by given specific time intervals, and track information TKI (corresponding to AOBI or CI) may be assigned to each divided AOB file.

In the above case, the divided AOB file number is made coincident with the assigned TKI number.

Only the head TKI (or the leading TKI) of each music number is specified from individual play list PL (after edition) defined by the user, not from default play list DPL. In this case, the still image(s) to be displayed in unit of the music number is(are) specified by the head TKI of each music number.

In the example shown in FIG. 8, an unrecorded area or unused area is provided for the contents of default play list DPL or those of track manager TKM (management information).

When an unrecorded area (unused area) can thus be set in management information, even if part of the management information is deleted by editing or the like, the handling of the management information can be simplified because the other part of the management information can be maintained intact.

Further, since the size of each TKM (management information) including the unused area is fixed to, for example, 1536 bytes, the management of the recording position (address) of each TKM (management information) can be simplified.

In view of this fact, the buffer memory size of the reproduction apparatus side required for the management information (or the size of a buffer (not shown) incorporated in, for example, information recording and reproducing section 3000 of the apparatus shown in FIG. 7) can be saved significantly.

Figure 9:
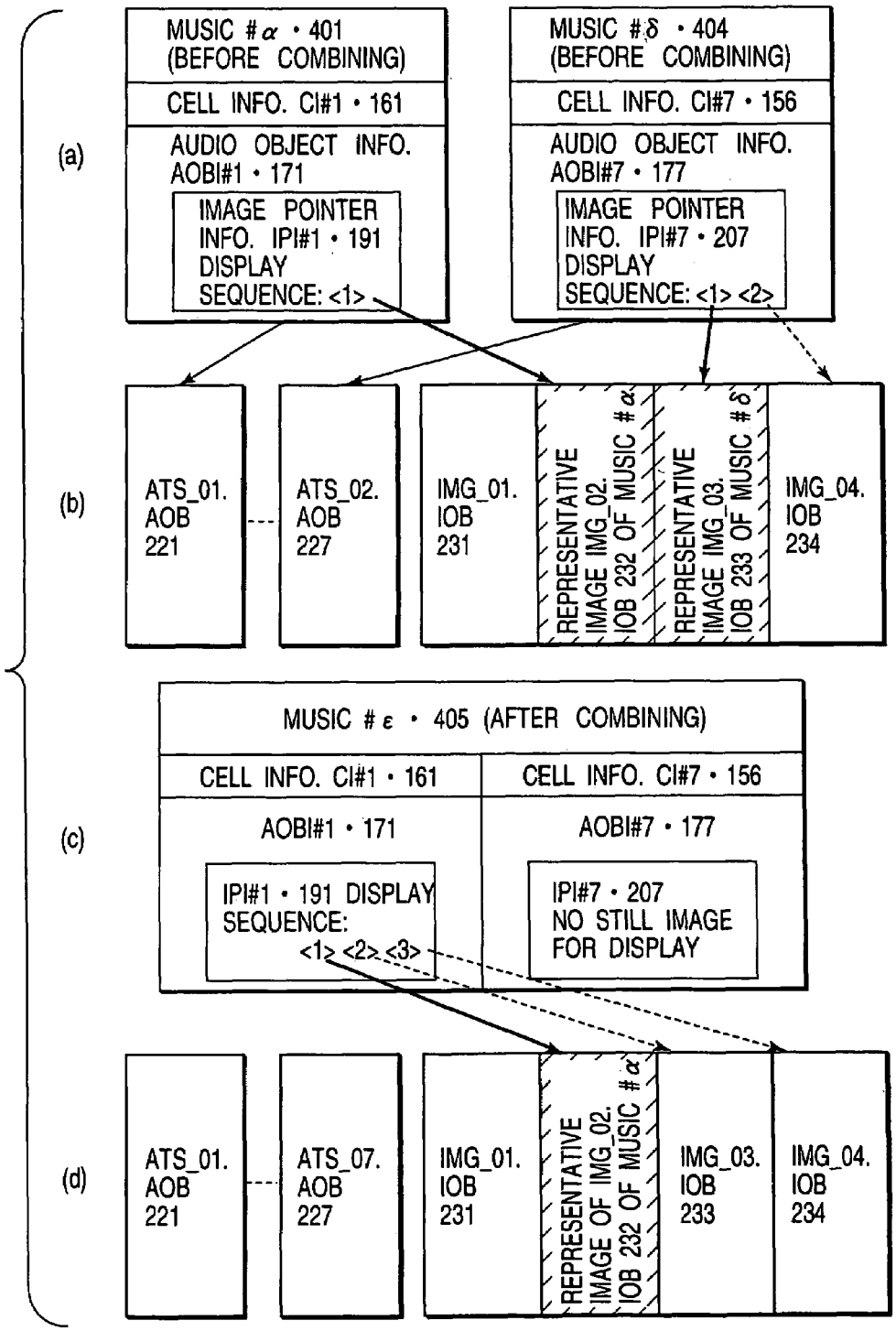
FIG. 9 is a view illustrating how the representative image of each music number after combining music is specified, wherein a plurality of music numbers with still images recorded in the information storage medium (memory card or disc) shown in FIG. 3 or FIG. 4 are combined by editing.

FIG. 9 is a view illustrating how the representative image of a music number after combining music is specified, wherein a plurality of music numbers with still images recorded in the information storage medium (memory card or disc) shown in FIG. 3 or FIG. 4 are combined by edit processing.

Hereinafter, a method for setting a representative image in unit of music during "combining music" processing will be described by referring to FIG. 9.

Here, let us consider a case in which one still image (IMG_02.IOB) is displayed during reproduction of music number #α 401 before being combined, and two still images (IMG_03.IOB and IMG_04.IOB) are displayed during reproduction of music number #δ 404.

Since IMG_03.IOB is displayed first during reproduction of music number #δ 404, IMG_03.IOB serves as a representative image indicative of the content of music number #δ 404.

After combining, as shown in (c) and (d) of FIG. 9, AOBI#1 and AOBI#7 themselves are left intact, and ATS_01.AOB and ATS_07.AOB are also left intact as audio information files. However, all items of information concerning still images, including representative image setting information, are concentrated in or grouped by IPI#1 contained in AOBI#1 that is the management information relevant to audio information file ATS_01.AOB to be reproduced first in music number #ϵ.

Here, the order of display is "IMG_02.IOB, IMG_03.IOB, and IMG_04.IOB" according to the display sequence (shown in (a) of FIG. 9) of images before being combined.

The first displayed IMG_02.IOB is automatically set as the representative image relevant to music number #ϵ after being combined.

Now, the processing of the above "combining music" performed in the information recording and reproducing apparatus shown in FIG. 7 will be described.

<11> First, the user issues an instruction of "combining music" to the information recording and reproducing apparatus shown in FIG. 7.

<12> Then, system control section 3020 issues an instruction to information recording and reproducing section 3000 so that information of IOBSI.IFO 2130 shown in FIG. 5 is reproduced. The reproduced information is temporarily stored in an area of a buffer memory (not shown) provided in system control section 3020.

<13> System control section 3020 again issues an instruction to information recording and reproducing section 3000 so that the corresponding AOBI#1 and AOBI#7 in AOBSI recording region 141 shown in (e) of FIG. 3 is reproduced. The reproduced information is temporarily stored in the buffer memory area contained in system control section 3020.

<14> The contents of IPI#7 in AOBI#7 are all set to "0" at system control section 3020, and the contents of IPI#1 in AOBI#1 are changed according to (c) of FIG. 9. Then, system control section 3020 issues an instruction to information recording and reproducing section 3000 so that the contents of the changed AOBI#1 and AOBI#7 are rewritten to the information storage medium.

<15> System control section 3020 again issues an instruction to information recording and reproducing section 3000 so that information of PGCSI.IFO 2110 shown in FIG. 5 is reproduced. The contents of the reproduced information are changed according to "combining music", and the information of PGCSI.IFO 2110 contained in the information storage medium is rewritten again.

<16> As a result of "combining music", the designation for IMG_03.IOB as the representative image of AOBI#7 becomes no longer effective. From this, "information on music number designated as representative image" 450 ((d) in FIG. 12) temporarily stored in the buffer memory area in system control section 3020, i.e., the number item of information (450) indicating "how many music numbers have their designated representative images" is reduced by 1, Then, the number item of the music number having its designated (but no longer effective) representative image is reset to "0", or the contents of information within one frame of AOBI/CI numbers 451 to 452 are all reset to "0".

Figure 11:
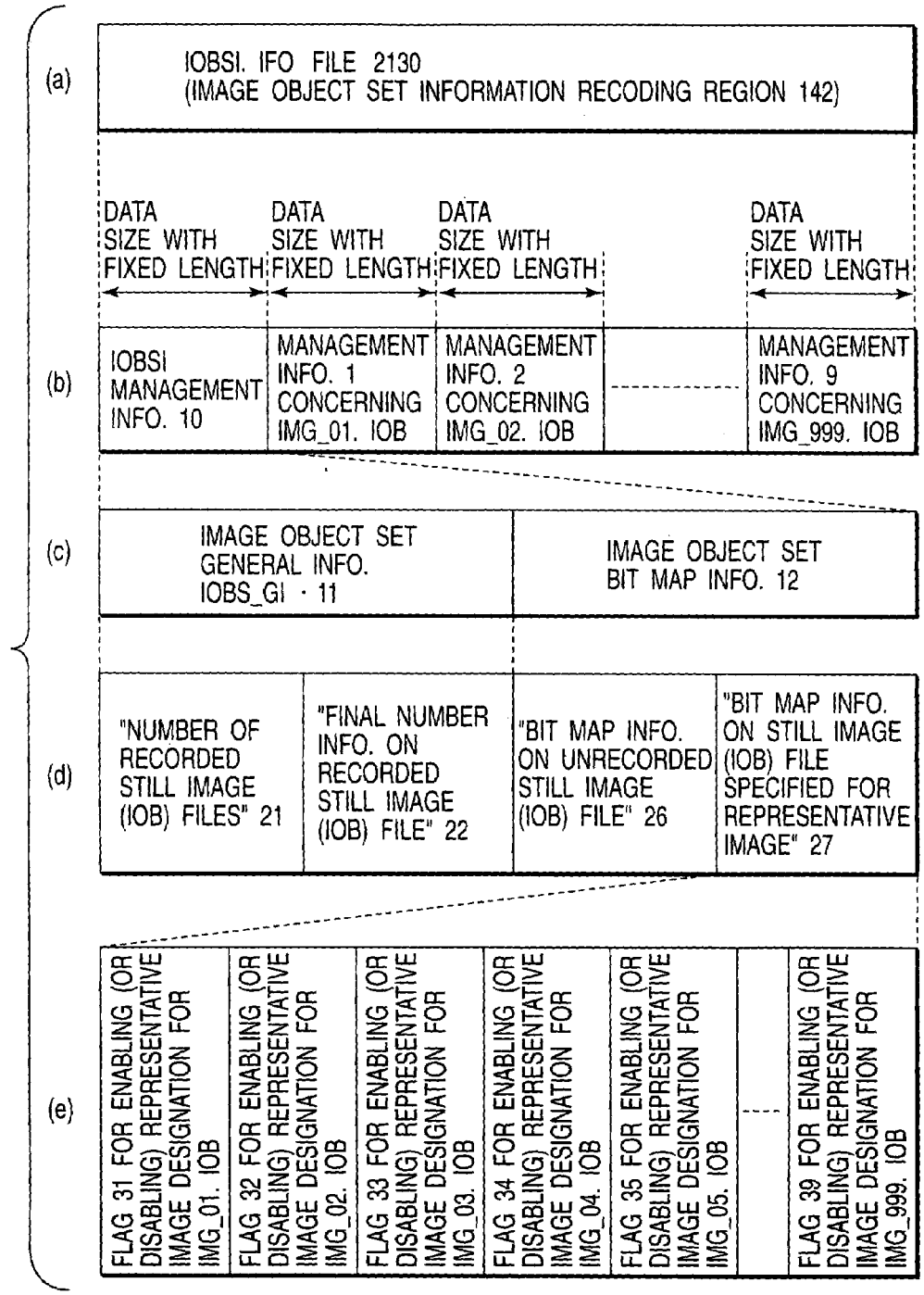
FIG. 11 is a view illustrating a data structure of IOBSI management information in image object set information (IOBSI.IFO) shown in FIG. 5.

<17> As a result of the above processing, if there is no music number (or AOBI/CI) designating or specifying the image of IMG_03.IOB as a representative image, the "1 bit" information contained in representative image designation enabling (or disabling) flag 33 relevant to IMG_03.IOB shown in (e) of FIG. 11 is changed from "1" to "0".

<18> IOBSI.IFO file 2130, the contents of which are changed by the processing of above <16>, temporarily stored in the buffer memory area in system control section 3020, is overwritten on the information storage medium via information recording and reproducing section 3000, so that the contents of the corresponding file are changed.

Figure 10:
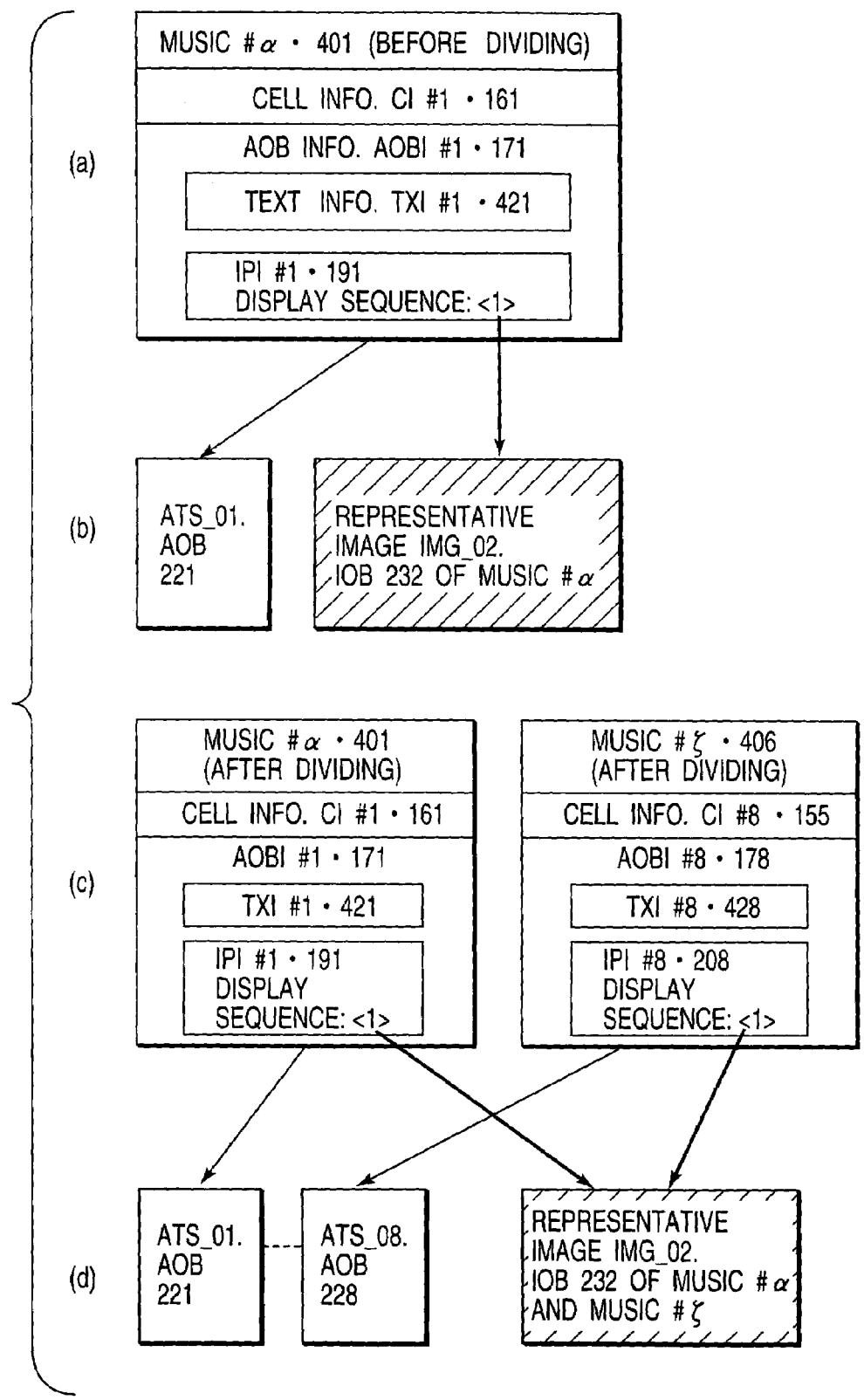
FIG. 10 is a view illustrating how the representative image of each music number after dividing music is specified, wherein a music number with its still image recorded in the information storage medium (memory card or disc) shown in FIG. 3

FIG. 10 is a view illustrating how the representative image after dividing music is specified, wherein a music number with its still image recorded in the information storage medium (memory card or disc) shown in FIG. 3 or FIG. 4 is divided by edit processing.

Hereinafter, a method for setting a representative image in unit of music during "dividing music" processing will be described with reference to FIG. 10.

One still image of IMG_02.IOB is displayed during reproduction of music number #α before being divided, and the still image of IMG_02.IOB is produced as a representative image indicative of the contents of music number #α 401.

As shown in (c) and (d) of FIG. 10, when one music number is divided into music numbers #α 401 and #ζ 406, the original audio object information is correspondingly divided into AOBI#1 and AOBI#8. In addition, the audio information file may be divided into ATS_01.AOB and ATS_08.AOB according to a condition or state of "dividing music".

At this time, the contents of text information TXI#1 and image pointer information IPI#1 in AOBI#1, before being divided, are copied intact (i.e., copied without any change) to TXT#1 and IPI#1 in AOBI#1 and to TXI#8 and IPI#8 in AOBI#8, after being divided.

As a result, IMG_02.IOB is specified for the representative image of both of music numbers #α 401 and #ζ 406.

As a result of "dividing music", since the same still image (IMG_02.IOB) serves as the representative image of plural music numbers, searching of a desired music number using the representative image on the display screen becomes slightly hard.

However, with the display of the representative image, the "number item of reproduced music number" and "text information concerning the music number" can be displayed simultaneously as shown in (d) of FIG. 1. From this, the difficulty in above searching is reduced to some extent.

Now, processing of the above "dividing music" performed in the information recording and reproducing apparatus shown in FIG. 7 will be described.

<21> An instruction for "dividing music" is issued by a user to the information recording/reproducing apparatus shown in FIG. 7.

<22> Then, an instruction is issued from system control section 3020 to information recording and reproducing section 3000, so that the information of IOBSI.IFO 2130 shown in FIG. 5 is reproduced. The reproduced information is temporarily stored in an area of a buffer memory (not shown) provided in system control section 3020.

<23> An instruction is again issued from system control section 3020 to information recording and reproducing section 3000, so that the corresponding AOBI#1 contained in AOBSI recording region 141 shown in (e) of FIG. 3 is reproduced. The reproduced information is temporarily stored in the buffer memory area in system control section 3020, similarly.

<24> The contents of the ATS_01.AOB file are changed in accordance with (d) of FIG. 10, and a new ATS_08.AOB file is created. The changed ATS_01.AOB file and the created ATS_08.AOB file are recorded in AOB recording region 131, shown in (d) of FIG. 3 or (d) of FIG. 4, contained in the information storage medium.

<25> AOBI#8 is newly created at system control section 3020, text information TXI#1 in AOBI#1 is copied to text information TXI#8 in the created AOBI#8, and the contents of IPI#1 in AOBI#1 are copied to IPI#8 in the created AOBI#8. Thereafter, an instruction is issued to information recording and reproducing section 3000, so that the changed contents of AOBSI recording region 141 is rewritten into the information storage medium.

<26> An instruction is again issued from system control section 3020 to information recording and reproducing section 3000, so that PGCSI.IFO 2110 shown in FIG. 5 is reproduced. The contents of the reproduced information are changed according to "dividing music", and then, the information of PGCSI.IFO 2110 in the information storage medium is rewritten again.

<27> As a result of "dividing music", the number of designation for IMG_02.IOB as the representative image is increased by the designation from the newly created AOBI#8. From this, "information on music number designated as representative image" 450 ((d) in FIG. 12) temporarily stored in the buffer memory area in system control section 3020, i.e., the number item of information (450) indicating "how many music numbers have their designated representative images" is increased by 1, Then, the AOBI number of the newly created AOBI#8 is added to the frame of the number item of music number having its designated representative image or to the frame of AOBI/CI numbers 451 to 452

<28> The IOBSI.IFO file 2130, the contents of which are changed by the processing of above <27>, temporarily stored in the buffer memory area in system control section 3020, is overwritten to the information storage medium via the information recording and reproducing section 3000, so that the contents of the corresponding file are changed.

FIG. 11 is a view illustrating a data structure of the IOBSI management information in the image object set information (IOBSI.IFO) shown in FIG. 5.

Figure 12:
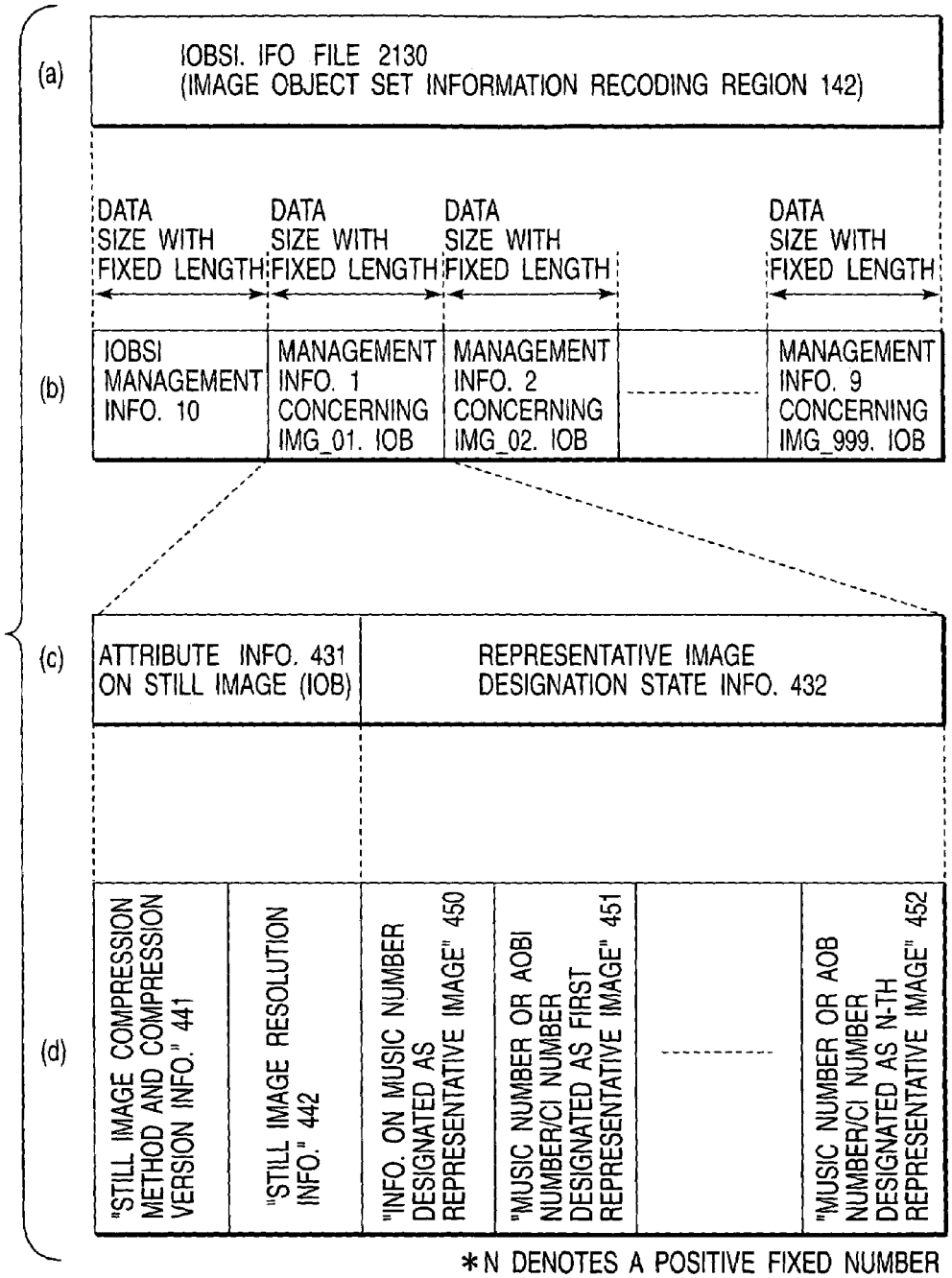
FIG. 12 is a view illustrating a data structure of management information concerning each image object (IMG_xx.IOB) in image object set information (IOBSI.IFO) shown in FIG. 5.

Further, FIG. 12 is a view illustrating a data structure of the management information concerning each image object (IMG_xx.IOB) contained in the image object set information (IOBSI.IFO) shown in FIG. 5.

Hereinafter, the data structure in the file of IOBSI.IFO 2130 will be described by referring to FIG. 11 and FIG. 12.

As shown in (b) of FIG. 11 or (b) of FIG. 12, the file of IOBSI.IFO 2130 is configured by IOBSI management information 10 having general information concerning all matters of still image information recorded therein and management information 1 to management information 9 respectively concerning IMG_01.IOB to IMG_999.IOB.

Note that this embodiment is characterized in that the data size of IOBSI management information 10 and the data size of each of management information 1 to management information 9 concerning IMG_01.IOB to IMG_999.IOB are fixed (or each of those data sizes has a fixed length).

By fixing the respective data sizes, it is possible to pre-know the destination of access at the time of recording or reproducing the management information concerning individual still images. This is a significant advantageous effect obtained by the embodiment of the present invention.

For example, when management information concerning IMG_02.IOB is to be reproduced, it is found that access may be made to the address obtained by adding the predetermined data sizes of IOBSI management information 10 and management information 1 concerning IMG_01.IOB to the leading address of IOBSI.IFO file 2130.

IOBSI management information 10 contains image object set general information IOBS_GI 11 having information generally concerning still images recorded therein. Recorded in this IOBS_GI 11 are number 21 of the recorded still image (IOB) file(s) and final number information 22 of the recorded still image (IOB) file(s), wherein number 21 representing the total number of the still image files (coincident with the number of still images) is recorded in IOB recording region 132 contained in the information storage medium (audio card 100 with its copy protection function or disc shaped information storage medium 170).

In addition, IOBS bit map information 12 having bit map information concerning all still images exists in IOBSI management information 10.

For the contents of bit map information 27 of the still image (IOB) file specified for or designated as a representative image, there are representative image designation enable (or disable) flags 31 to 39. These flags are assigned by one bit for each file, e.g., by 1 bit for the IMG_01.IOB file, 1 bit for the IMG_02.IOB file, and so on. The flag "1" is set to a still image file in which a still image designated as a representative image of the still image file is stored (flag "0" is set to a still image file in which no still image designated as a representative image is stored).

Each of management information 1 to management information 9 respectively concerning still image files contains still image attribute information 431 and representative image designation state information 432, as shown in (d) of FIG. 12.

In still image attribute information 431, information 441 of "still image compression method such as JPEG or MPEG (I picture) and version of compression" and information 442 of "still image resolution" are recorded.

In representative image designation state information 432, there are recorded the number item of information (450) indicating "how many music numbers have their designated representative images", and N pieces of "number items of music numbers, AOBI numbers, or CI numbers" having originally designated representative images 451 to 452 (N denotes a positive fixed number).

Here, N represents the upper limit number of the music numbers which can designate one still image as their representative images, or N represents the upper limit number of the audio information files which can designate one still image as their representative images. Although N may be 999 at maximum, a preferable number of N is actually 10 or less.

As shown in (d) of FIG. 12, representative image designation state information 432 contains description frames up to N frames, the N-th of which indicates "music number or AOBI number/CI number designated as N-th representative image" 452. According to "music number designated as representative image" 452, the frames are sequentially filled by the number information from "music number or AOBI number/CI number designated as first representative image" 451, and the remainders, if any, are all set to "0".

Figure 14:
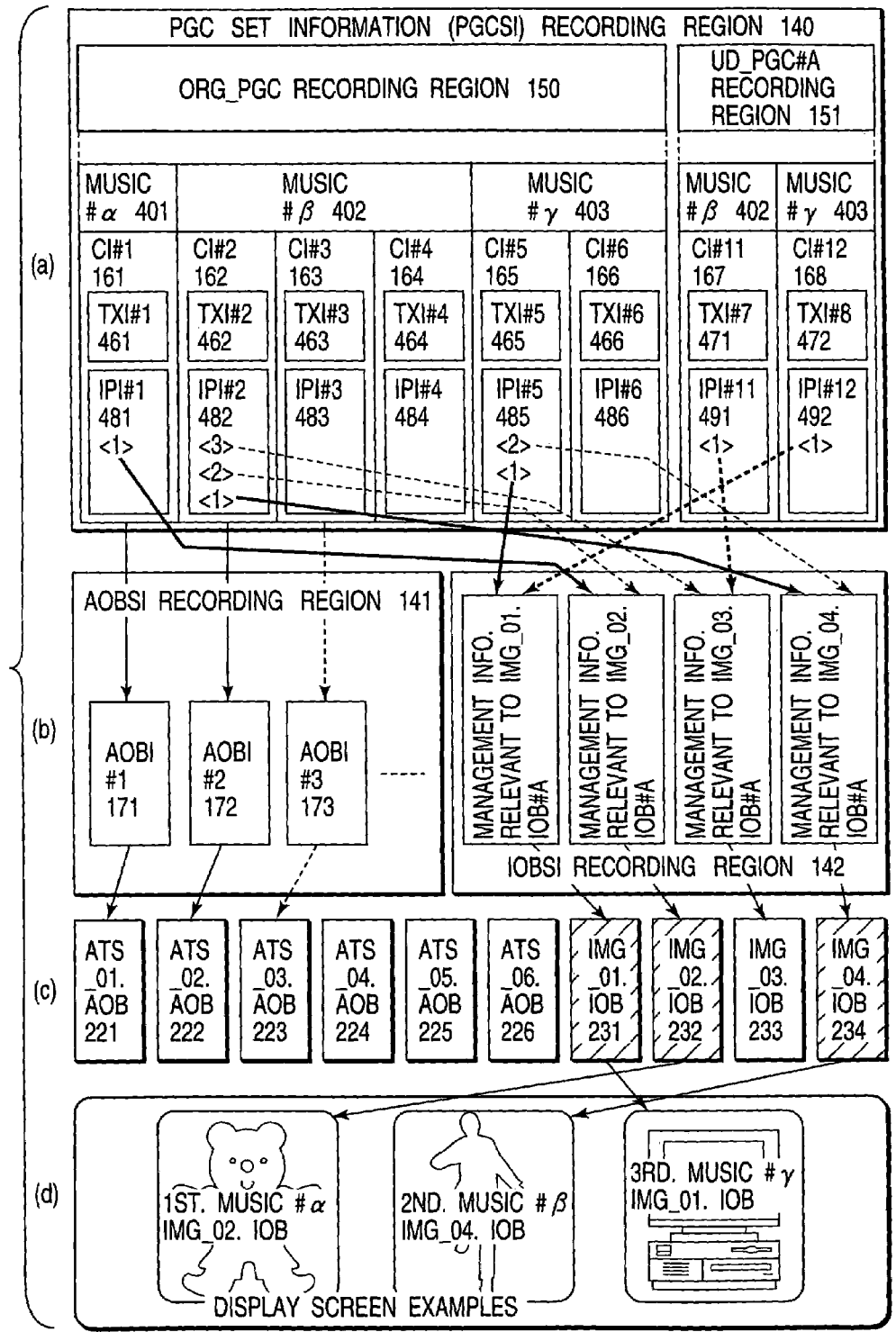
FIG. 14 is a view illustrating another example of how the representative image of each music number is displayed, wherein audio information with still image is recorded in the medium according to an embodiment of the present invention.

The data structure in IOBSI.IFO file 2130 shown in FIG. 11 or FIG. 12 is also applicable to the data structure shown in FIG. 14 without being limited to the data structure shown in FIG. 1 or FIG. 2.

Figure 13:
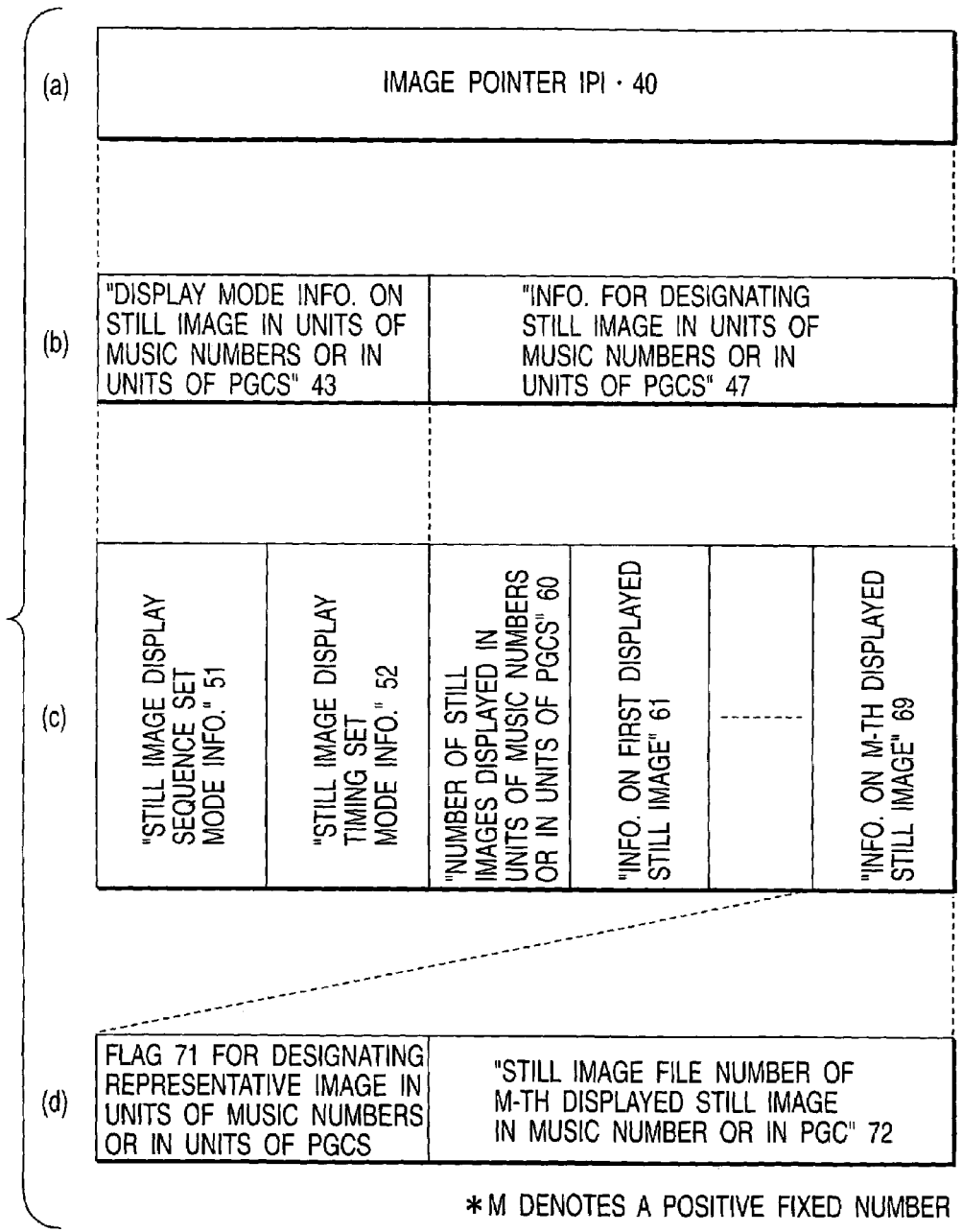
FIG. 13 is a view illustrating a data structure of image pointer information (IPI) shown in FIG. 1, FIG. 2, etc.

FIG. 13 is a view illustrating the data structure of image pointer information (IPI) shown in FIG. 1 or FIG. 2 and the like.

Display mode information 43 and the designating information 47 on still image are recorded in the image pointer information (IPI) 40 shown in (a) of FIG. 13.

Display mode information 43 contains two types of switching information such as display sequence set mode information 51 and display timing set mode information 52. Display sequence set mode information 51 indicates either of a "sequential mode" to be sequentially displayed in accordance with the reproduction sequence specified in (c) of FIG. 13 or a "random and/or shuffle mode" displayed randomly for the still image specified in (c) of FIG. 13. Display timing set mode information 52 indicates either of a "slide show" system for switching the still image automatically displayed during music reproduction or a "browse enabling" system for switching the displayed still image at the timing when a switching input is given by the user.

In the present embodiment, a maximum of M still images can be displayed in units of music numbers or in units of PGCs. This M is a fixed value, and the fixed value is selected from, for example, the range of 5 to 100 images. Preferably, the M is selected to be about 20 images.

The data size of image pointer information (IPI) 40 is always fixed, and frames of description for still images are set first, from the description frame of first displayed still image information 61 to the description frame of M-th displayed still image information 69, as shown in (c) of FIG. 13.

Within the description frame of still image information 61 to that of information 69 on the M-th displayed still image, the file numbers of the still image files specified or designated by IPI 40 (for example, "02" in the case of IMG_02.IOB) are recorded in the order of display sequence.

When a small number of still image files are specified or designated, the remaining portions of the description frames are all filled with "0". For example, if no still image file is specified by IPI 40, "10" is recorded in each of all description frames of first displayed still image information 61 to that of M-th displayed still image information 69.

The number information of still images specified or designated by each IPI 40 is recorded in "number of still images displayed in units of music numbers or in units of PGCs" 60 shown in (c) of FIG. 13. By reproducing this information (60), it is found that there are recorded "specified still image file number information" from the description frame of first displayed still image 61 to where in the description frame of M-th displayed still image information 69.

In the present embodiment, the still image stored in the still image file corresponding to still image file number 72, which is specified or designated in "first displayed still image information" 61 shown in (c) of FIG. 13, is produced as the representative image.

However, the present invention is not limited to the above. For example, the first 1 bit of information 61 to 69 on still images displayed in their respective sequence is assigned to flag 71 for specifying or designating a representative image in units of music numbers or in units of PGCs as shown in (d) of FIG. 13.

The still image stored in the still image file number in which its 1 bit is set to "1" can be set as the representative image. When this bit setting method is employed, a still image other than the "first displayed still image" in unit of music number or in unit of PGC can be set as a representative image.

FIG. 14 is a view illustrating another example of how the representative image of each music number is displayed, wherein audio information with its still image recorded in the medium according to an embodiment of the present invention is reproduced in units of music numbers.

First, a method for setting a representative image will be described.

A method for setting a represent image using image pointer information IPI#1 to IPI#12 (i.e., a method for setting the still image to be displayed first in units of music numbers as a representative image; or a method for setting as a representative image the still image set by flag 71 for designating a representative image in units of music numbers or in units of PGCs as shown in (d) of FIG. 13) has been described previously. In these methods, a still image file number is directly specified.

In contrast, in the application examples described hereinafter, as shown in (b) of FIG. 14, the numbers of management information 1 to management information 4 are specified for each still image information file contained in IOBSI recording region 142.

That is, according to the data structure shown in FIG. 1, the still image information to be displayed during reproduction of the music number specified in user defined PGC (UD_PGC#A) recording region 151 coincides with the still image information to be displayed during reproduction of the music number specified in original PGC (ORG_PGC) information recording region 150.

In contrast, according to the data structure shown in FIG. 14, IPI#11 and IPI#12 contained in cell information CI#11 and CI#12 defined in UD_PGC#A recording region 151 can specify or designate an arbitrary still image(s), and are not restricted by the still image to be reproduced for each music number specified or designated in ORG_PGC information recording region 150.

Namely, "management information 1 to 4 relevant to IMG_xx.IOB" shown in (b) of FIG. 14 may serve as a conversion file with respect to pointer information (IPI#) for specifying or designating the still image (IMG_xx.IOB). This is a significant feature of the embodiment shown in FIG. 14.

In the embodiment shown in FIG. 14, there is provided a structure in which the number information of management information 1 to 9 concerning respective IMG_xx.IOB shown in (b) of FIG. 12 is recorded instead of "still image file number 72 of still image to be M-th displayed in unit of music number or in unit of PGC".

Note that the embodiment shown in FIG. 1 has a structure in which the still image information file to be displayed during reproduction of music number #β 402 or #γ 403 defined in the user defined PGC#A (IMG_01.IOB personal computer or IMG_04.IOB running businessman) coincides with the still image information file (IMG_01.IOB personal computer or IMG_04.IOB running businessman) to be displayed during reproduction of music numbers #γ 403 or #β 402 defined in the original PGC, and this still image information file cannot be arbitrarily changed.

In contrast, according to the embodiment shown in FIG. 14, since each cell information CI# has individual image pointer information IPI#, it is possible to arbitrarily set a still image file of the still image targeted to be displayed for each CI.

Figure 15:
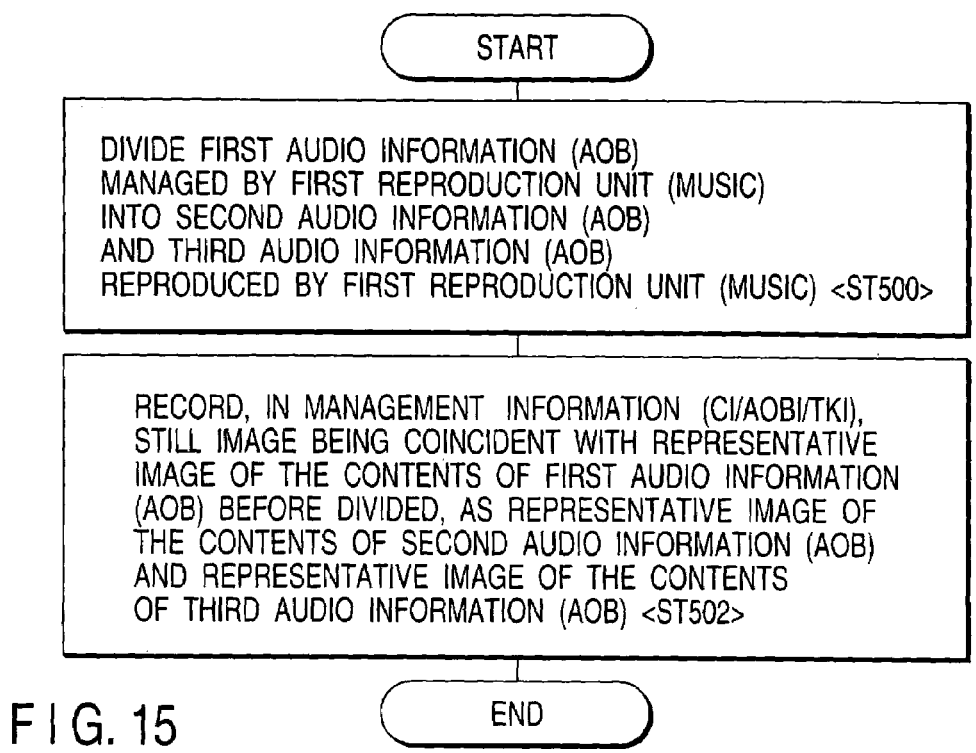
FIG. 15 is a flow chart illustrating how the representative image of each music number after dividing music is recorded, wherein a music number with its still image is divided by editing.

FIG. 15 is a flow chart illustrating how the representative image of each music number after dividing music is recorded, wherein a music number with its still image is divided by edit processing.

First, the first audio information (ATS_xx.AOB) managed by the first reproduction units (music numbers) is divided into second audio information (for example, ATS_01.AOB shown in (d) of FIG. 10) and third audio information (for example, ATS_08.AOB shown in (d) of FIG. 10) reproduced by the first reproduction units (music numbers) (step ST500).

Subsequently, a representative image (for example, IMG_02.IOB shown in (b) of FIG. 10) of the contents of the first audio information (for example, ATS_02.AOB shown in (b) of FIG. 10) before being divided is selected as the representative image (IMG_02.IOB shown in (d) of FIG. 10 of the second audio information (ATS_01.AOB shown in (d) of FIG. 10) as well as the representative image (IMG_02.IOB shown in (d) of FIG. 10) of the third audio information (ATS_08.AOB show FIG. 10D). The thus selected representative image (IMG_02.IOB) is recorded in the management information (CI#1/AOBI#1 and CI#8/AOBI#8 shown in (c) of FIG. 10; TKI# shown in FIG. 8) of the music numbers (music numbers #α and #ζ) after being divided (step ST502).

In this manner, when music number #α after being divided is reproduced or when music number #ζ after being divided is reproduced, the same image (IMG_02.IOB) as the representative image of the music number before being divided is automatically reproduced as its representative image.

Figure 16:
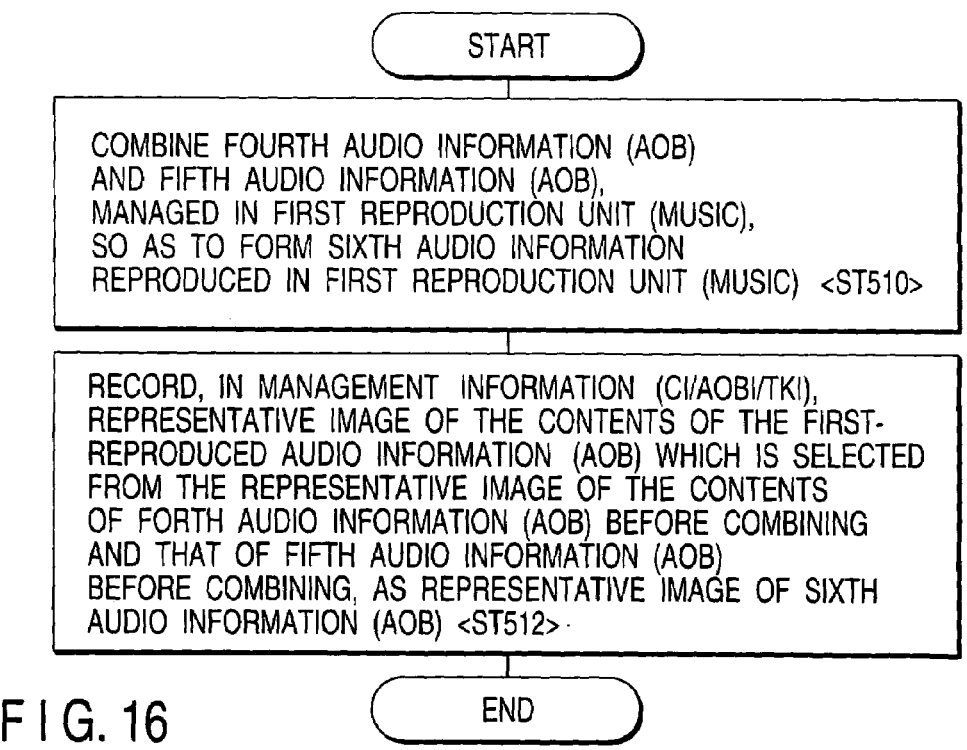
FIG. 16 is a flow chart illustrating how the representative image of the music number after combining music is recorded, wherein a plurality of music numbers with still images are combined by editing.

FIG. 16 is a flow chart illustrating how the representative image of the music number after combining music is recorded, wherein a plurality of music numbers with their still images are combined by edit processing.

First, the fourth audio information (for example, ATS_01.AOB shown in (b) of FIG. 9) and fifth audio information (for example, ATS_07.AOB shown in (b) of FIG. 9) managed in the first reproduction units (for example, music numbers #α and #δ shown in (a) of FIG. 9) are combined with each other to form sixth audio information (ATS_01.AOB. ATS_07.AOB) to be reproduced in the first reproduction unit (for example, music number #ε shown in (c) of FIG. 9) (step ST510).

Subsequently, from the representative image (IMG_02.IOB shown in (b) of FIG. 9) of the fourth audio information (ATS_01.AOB) and the representative image (IMG_03.IOB shown in (b) of FIG. 9) of the fifth audio information (ATS_07.AOB), the representative image (IMG_02.IOB) of the contents of audio information (ATS_01.AOB) to be first reproduced after being combined is selected, and the selected representative image (IMG_02.IOB) is recorded as the representative image (IMG_02.IOB shown in (d) of FIG. 9) of the contents of the sixth audio information (ATS_01.AOB. ATS_07.AOB) in the management information (CI#1/AOBI#1 shown in (d) of FIG. 9; TKI# shown in FIG. 8) of music number #ε after being combined (step ST512).

In this manner, when music number #ζ after being combined is reproduced, the same image (IMG_02.IOB) as the representative image of the first reproduced one of music numbers #α and #δ before being combined is automatically reproduced as its representative image.

Figure 17:
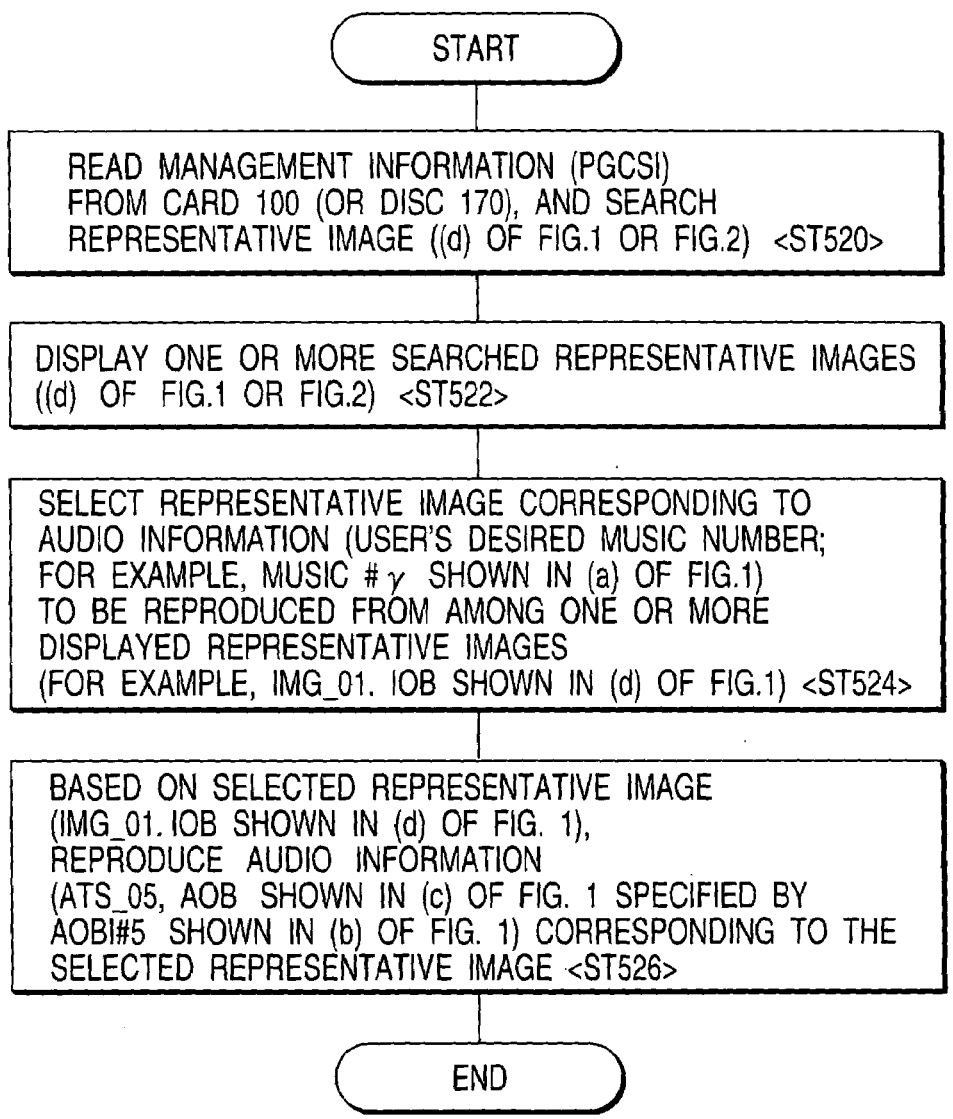
FIG. 17 is a flow chart illustrating the procedure for displaying the image representative of each music number from a plurality of music numbers with still images, and the procedure for, by selecting the displayed representative image, reproducing the music number corresponding to the selected representative image.

FIG. 17 is a flow chart illustrating the procedures for displaying an image representative of each music number from a plurality of music numbers with their still images, and reproducing the corresponding music number by selecting the displayed representative image.

IOBSI.IFO 2130 file shown in FIG. 5 is recorded, as the management information concerning a still image file, in IOBSI recording region 142 shown in (b) of FIG. 14, (e) of FIG. 3, or (e) of FIG. 4.

A method for displaying on a screen the representative image going back to the information recorded in PGCSI recording region 140 has been described previously. By utilizing IOBSI.IFO file 2130, the representative image can be searched and/or displayed more simply than using the previously described method.

The method enabling the above simple searching/displaying will be explained below.

<31> First, the user issues an instruction "menu display" to the information recording and reproducing apparatus shown in FIG. 7.

<32> Then, an instruction is issued from system control section 3020 to information recording and reproducing section 3000 shown in FIG. 7, so that IOBSI.IFO file 2130 (FIG. 5) recorded in IOBSI recording region 142 shown in (e) of FIG. 3E or (e) of FIG. 4 is reproduced. The reproduced file is temporarily stored in the buffer memory (not shown) provided in system control section 3020.

<33> System control section 3020 reads out "bit map information on the still image (IOB) file specified for a representative image" 27 shown in (d) and (e) of FIG. 11 from IOBSI.IFO file 2130 temporarily stored in the buffer memory, and extracts the still image (IOB) file specified for or designated as the representative image (step ST520 in FIG. 17).

<34> Based on the information obtained by the above <33>, an instruction is issued from system control section 3020 to information recording and reproducing section 3000, so that the corresponding still image information file contained in IOB recording region 132 in (d) of FIG. 3 or (d) of FIG. 4 is reproduced.

<35> The reproduced still image information file set as a representative image is sent to image decoder 3330 via information recording and reproducing section 3000 and transfer destination switching section (data/command bus line) 3220 for output data/control information. The thus sent file as the representative image is decoded in image decoder 3330.

Then, the decoded representative image data is subjected to display-size reduction processing in video processor section 3770 so that a plurality of representative images can be allocated in line on the display screen of display section 3710.

<36> The video output from video processor section 3370 is displayed intact at image display section 3710 (step ST522).

<37> The user can select, by cursor operation or the like, a specific music number that he or she wants to reproduce from a plurality of representative images ((d) of FIG. 1, etc.) displayed on the display screen of display section 3710 (step ST524).

When the specific music number is selected, the information of "music numbers or AOBI numbers/CI numbers" 451 to 452 shown in (d) of FIG. 12 is searched from IOBSI.IFO file 2130 temporarily stored in system control section 3020.

Then, the audio information file (for example ATS_02.AOB) corresponding to the searched information is reproduced, and an output of the reproduced audio information is obtained from external output terminal (head phone or speaker) 3720 (step ST526).

As is evident from the foregoing description, according to the present embodiment, IOBSI.IFO file 2130 (FIG. 5) is temporarily stored in the buffer memory (not shown) of system control section 3020, and is processed. Since the processing is performed by accessing the buffer memory (not accessing the information storage medium itself), the frequency of reproduction access to the information storage medium (memory card shown in FIG. 3 or optical disc shown in FIG. 4) becomes very low.

As a result, representative image display and search processing based on the user selection of the displayed representative image(s) can be performed very speedily and simply.

Advantages obtained by the preferred embodiments of the present invention described hereinbefore can be summarized as follows.

1. A desired music number can be searched readily and easily because the contents of music number is visualized.

As is exemplified in (d) of FIG. 1 or (d) of FIG. 2, the information on music numbers recorded in the information storage medium can be displayed simultaneously by music image (still image), music number, or music title (or related information), and thus, the user can search a desired music very simply.

2. For the human, a connection between an image and a melody is relatively strong, so that a desired music number can be easily searched by utilizing such an image.

Many users experience a case in which a music title and its melody in his/her memories do not coincide with each other. In a case where the user remembers the melody, but does not know its music title, it is often that a desired music number cannot be identified even if a list of music titles is displayed as in an MD. However, for the human, since a connection between the melody and the singer's face photograph is so strong, a desired music number can be searched immediately by the singer's face photography. In this manner, an image (still image) being matched with the music number can be set as a representative image, so that the user who does not remember the music title can search a desired music number easily.

3. A representative image can be set without a burden on the user because the representative image is automatically set.

Once a still image to be displayed when audio information is reproduced in unit of music number (or in unit of program chain PGC/play list PL) is determined, a representative image corresponding to the contents of the music number can be automatically set. Thus, there is no need for the user to take long to set the representative image.

4. A representative image can be easily set or changed because representative image setting information can be simply configured.

Since menu information of the DVD video is complicated, new representative image setting/changing processing becomes complicated.

In contrast, according to the embodiment of the present invention, the representative image can be set very easily by selecting either "setting the first displayed still image for music number (cf. IPI display sequence <1> as shown in FIG. 1, etc.) as the representative image" or "setting a representative image designation flag (cf. 71 shown in (d) of FIG. 14). Therefore, the representative image can be set and/or changed very easily by an information recording/reproducing apparatus, so that the apparatus with the representative image setting/changing function can be manufactured inexpensively.

5. A representative image corresponding to "combined or divided music" can be automatically set.

According to DVD video menu information, a representative image corresponding to "combined or divided music" cannot be set. According to MD, there is no still image information corresponding to music numbers and, therefore, a representative image corresponding to "combined or divided music" cannot be set.

In contrast, according to the embodiment of the present invention, a system is provided so that a representative image relevant to "combined or divided music" (or a representative image relevant to a music number/music piece after being combined or divided) is set automatically during the process of "combining or dividing music". Therefore, the representative image relevant to the music number after being combined or divided can be set without a burden on the user after the process of "combing or dividing music".

6. Setting of a representative image at the time of "combing or dividing music" can be made very easily, and a load on the information recording/reproducing apparatus is reduced.

If the still image information displayed during music reproduction is set during the "combing or dividing music", the representative image is automatically determined. Therefore, there is no need for newly setting a representative image during the process of "combing or dividing music", and a processing load on the information recording/reproducing apparatus can be significantly reduced.

7. A data structure is provided so that the user can set or change a representative image easily.

According to the embodiment of the present invention, the representative image can be set very easily by selecting either "setting the first displayed still image for music number (cf. IPI display sequence <1> as shown in FIG. 1, etc.) as the representative image" or "setting a representative image designation flag" (cf. 71 shown in (d) of FIG. 14).

Therefore, in the case where a representative image is set or changed, only "changing a still image sequence displayed by music number" or "setting/changing a representative image designation flag" will be sufficient. For this reason, a load on the information recording/reproducing apparatus for setting/changing the representative image is significantly reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium for storing audio information and image information, comprising:
   a data area configured to store the audio information and the image information; and
   a management area configured to store management information of the audio information and the image information, the management information including first management information and second management information, wherein
   the first management information includes a time search table configured to search for the stored audio information,
   the second management information includes numeral information describing a number status of the still images,
   the management information of the image information includes plural sets of management information items, and
   each set of the management information items is configured to contain said numeral information.

2. The medium of claim 1, wherein the management information provides a functionality with respect to the audio or image information such that when processed by a medium access device or apparatus, the audio or image information is managed and processed according to the management information.

3. The medium of claim 1, wherein the number status of the still images includes a bit setting configuration indicative of a representative image.

4. A method for recording audio information and image information on an information storage medium which comprises a data area configured to store the audio information and the image information and a management area configured to store the management information of the audio information and the image information, the management information including first management information and second management information, wherein the first management information includes a time search table configured to search for the stored audio information, the second management information includes numeral information describing a number status of the still images, the management information of the image information includes plural sets of management information items, and each set of the management information items is configured to contain said numeral information, said method comprising:
   recording at least one of the audio information and the image information on the data area; and recording management information of the audio information on the management area.

5. A method for reproducing audio information and image information from an information storage medium which comprises a data area configured to store the audio information and the image information; and a management area configured to store the management information of the audio information and the image information, the management information including first management information and second management information, wherein the first management information includes a time search table configured to search for the stored audio information, the second management information includes numeral information describing a number status of the still images, the management information of the image information includes plural sets of management information items, and each set of the management information items is configured to contain said numeral information, said method comprising:

reproducing management information from the management area; and reproducing at least one of the audio information and the image information from the data area.

6. An apparatus for recording audio information and image information on an information storage medium which comprises a data area configured to store the audio information and the image information, and a management area configured to store management information of the audio information and the image information, the management information including first management information and second management information, wherein the first management information includes a time search table configured to search for the stored audio information, the second management information includes numeral information describing a number status of the still images, the management information of the image information includes plural sets of the management information items, and each set of the management information items is configured to contain said numeral information, said apparatus comprising:

an audio encoder configured to encode an audio input to generate encoded audio information;

a first recorder configured to record at least one of the encoded audio information and the image information on the data area; and a second recorder configured to record the management information on the management area.

7. An apparatus for reproducing audio information and image information from an information storage medium which comprises a data area configured to store the audio information and the image information, and a management area configured to store management information of the audio information and the image information, the management information including first management information and second management information, wherein the first management information includes a time search table configured to search for the stored audio information, the second management information includes numeral information describing a number status of the still images, the management information of the image information includes plural sets of management information items, and each set of the management information items is configured to contain said numeral information, said apparatus comprising:

a first reproducer configured to reproduce the management information of the audio information from the management area;

a second reproducer configured to reproduce at least one of the audio information and the image information from the data area;

an audio decoder configured to decode the audio information reproduced by the second reproducer; and an image decoder configured to decode the image information reproduced by the second reproducer.

8. The apparatus of claim 7, further comprising:

an image display section configured to display contents of the image information decoded by the image decoder.

9. A semiconductor memory device for storing audio information and image information, comprising:

a data area configured to store the audio information and the image information; and a management area configured to store management information of the audio information and the image information, wherein the management information of the audio information includes a time search table configured to search for the stored audio information, the management information of the image information includes plural sets of management information items, and each set of the management information items is configured to contain numeral information describing a number status of still images.

10. A method for recording the audio and image information on the semiconductor memory device as defined in claim 9, said method comprising:

recording at least one of the audio information and the image information on the data area; and recording the management information on the management area.

11. A method for reproducing the audio and image information from the semiconductor memory device as defined in claim 9, said method comprising:

reproducing the management information from the management area; and reproducing at least one of the audio information and the image information from the data area.

* * * * *